(12) United States Patent
Shimakawa et al.

(10) Patent No.: US 10,860,010 B2
(45) Date of Patent: Dec. 8, 2020

(54) INFORMATION PROCESSING APPARATUS FOR ESTIMATING BEHAVIOUR OF DRIVING DEVICE THAT DRIVES CONTROL TARGET, INFORMATION PROCESSING METHOD AND COMPUTER READABLE RECORDING MEDIUM

(71) Applicant: OMRON Corporation, Kyoto (JP)

(72) Inventors: Haruna Shimakawa, Kyoto (JP); Taku Oya, Kyoto (JP)

(73) Assignee: OMRON Corporation, Kyoto (JP)

( * ) Notice: Subject to any disclaimer, the term of this patent is extended or adjusted under 35 U.S.C. 154(b) by 55 days.

(21) Appl. No.: 16/103,944

(22) Filed: Aug. 15, 2018

(65) Prior Publication Data
US 2019/0227534 A1 Jul. 25, 2019

(30) Foreign Application Priority Data
Sep. 27, 2017 (JP) ................................. 2017-186026

(51) Int. Cl.
*G05B 19/418* (2006.01)
*B25J 9/12* (2006.01)
(Continued)

(52) U.S. Cl.
CPC .......... *G05B 19/41885* (2013.01); *B25J 9/12* (2013.01); *B25J 9/1671* (2013.01);
(Continued)

(58) Field of Classification Search
CPC ...... B25J 9/1671; B25J 9/1666; B25J 9/1664; B25J 9/1605; B25J 9/1676; B25J 9/162;
(Continued)

(56) References Cited

U.S. PATENT DOCUMENTS 5,378,972 A * 1/1995 Takenaka ............. B62D 57/032
318/568.22
5,400,244 A * 3/1995 Watanabe ............ G05D 1/0242
180/404
(Continued)

FOREIGN PATENT DOCUMENTS

| JP | 2017097426 | 6/2017 |
|----|------------|--------|
| WO | 2016181455 | 11/2016 |

OTHER PUBLICATIONS

"Search Report of Europe Counterpart Application", dated Feb. 4, 2019, p. 1-p. 9.

*Primary Examiner* — Darrin D Dunn
(74) *Attorney, Agent, or Firm* — JCIPRNET

(57) ABSTRACT

An information processing apparatus includes a first emulator that estimates a behavior of a device for driving a first control target that moves on a first target trajectory and a second emulator that estimates a behavior of a device for driving a second control target that moves on a second target trajectory. A visualization module generates drawing data for visualizing and drawing movement of the first control target and movement of the second control target in a three-dimensional virtual space by using a first command value and a second command value. The first and second emulators calculate the first command value and the second command value that control first and second driving devices in each control cycle according to a calculation command respectively. The calculation command instructs to calculate the command value for setting a movement amount in each control cycle variable.

10 Claims, 19 Drawing Sheets

(51) Int. Cl.
*B25J 9/16* (2006.01)
*G06F 3/14* (2006.01)
*G06F 3/0482* (2013.01)
*G06F 3/0484* (2013.01)

(52) U.S. Cl.
CPC .............. *G05B 2219/32343* (2013.01); *G05B 2219/32351* (2013.01); *G05B 2219/34288* (2013.01); *G05B 2219/50391* (2013.01); *G06F 3/0482* (2013.01); *G06F 3/04847* (2013.01); *G06F 3/14* (2013.01)

(58) Field of Classification Search
CPC ................ G06F 30/20; G05B 19/4069; G05B 19/41885; G05B 2219/40317; G05B 2219/40311; G05B 2219/32351; G05B 2219/35308; G05B 2219/35311; G05B 2219/40313; G05B 2219/40315; G05B 2219/23456; G05B 2219/32342; G05B 2219/32357; G05B 2219/35148; G05B 2219/40122; G05B 2219/40314; G05B 2219/40322; G05B 2219/40324; G05B 2219/42189; Y02P 90/26; Y02P 90/265; Y02P 90/86; Y02P 90/20; Y02P 90/22
See application file for complete search history.

(56) References Cited

U.S. PATENT DOCUMENTS

| | | | | |
|---|---|---|---|---|
| 5,483,440 | A * | 1/1996 | Aono | B25J 9/1689 318/568.25 |
| 5,526,254 | A * | 6/1996 | Sato | B25J 9/1671 700/56 |
| 5,825,981 | A * | 10/1998 | Matsuda | G05B 19/41815 700/248 |
| 6,928,337 | B2 * | 8/2005 | Watanabe | B25J 9/1671 361/679.02 |
| 7,211,978 | B2 * | 5/2007 | Chang | B25J 9/1669 318/568.11 |
| 7,606,633 | B2 * | 10/2009 | Hosokawa | B25J 9/1666 318/568.11 |
| 7,917,863 | B2 * | 3/2011 | Chandhoke | G05B 19/0426 715/765 |
| 8,300,055 | B2 * | 10/2012 | Niles | G06F 3/04815 345/419 |
| 8,725,294 | B2 * | 5/2014 | Gienger | B25J 9/1664 700/259 |
| 9,360,861 | B2 * | 6/2016 | Hahn | G05B 19/4069 |
| 9,364,951 | B1 * | 6/2016 | De Sapio | G05B 19/19 |
| 9,387,589 | B2 * | 7/2016 | Barajas | B25J 9/1697 |
| 9,418,394 | B2 * | 8/2016 | Atohira | G06T 1/00 |
| 9,475,192 | B2 * | 10/2016 | Liang | G06F 30/20 |
| 9,902,067 | B2 * | 2/2018 | Inoue | B25J 9/1666 |
| 9,922,144 | B2 * | 3/2018 | Embon | G06F 16/24578 |
| 9,984,178 | B2 * | 5/2018 | Kuwahara | G06F 30/20 |
| 10,025,291 | B2 * | 7/2018 | Oya | G05B 19/4069 |
| 10,035,267 | B2 * | 7/2018 | Matthias | B25J 9/1676 |
| 10,126,718 | B2 * | 11/2018 | Namie | G05B 13/048 |
| 10,274,923 | B2 * | 4/2019 | Nishiyama | G05B 19/056 |
| 10,384,347 | B2 * | 8/2019 | Nishitani | G06F 30/17 |
| 10,406,689 | B2 * | 9/2019 | Takeda | B25J 9/1671 |
| 10,437,211 | B2 * | 10/2019 | Furuta | G05B 19/4069 |
| 10,521,522 | B2 * | 12/2019 | Kuwahara | B25J 9/1671 |
| 10,534,876 | B2 * | 1/2020 | Atohira | G06F 30/20 |
| 2001/0034559 | A1 * | 10/2001 | Brown | G05B 19/042 700/17 |
| 2002/0133264 | A1 * | 9/2002 | Maiteh | G05B 19/4097 700/182 |
| 2003/0018400 | A1 * | 1/2003 | Tuttle | B25J 9/1605 700/29 |
| 2003/0074170 | A1 * | 4/2003 | Watanabe | B25J 9/1671 703/6 |
| 2003/0078682 | A1 * | 4/2003 | Tezuka | G05B 17/02 700/31 |
| 2003/0090491 | A1 * | 5/2003 | Watanabe | B25J 9/1671 345/473 |
| 2005/0049749 | A1 * | 3/2005 | Watanabe | B25J 9/1671 700/245 |
| 2005/0055134 | A1 * | 3/2005 | Okuda | B25J 9/1666 700/245 |
| 2005/0071306 | A1 * | 3/2005 | Kruszewski | G06T 13/40 706/47 |
| 2005/0090929 | A1 * | 4/2005 | Dolansky | G05B 19/4069 700/169 |
| 2005/0102054 | A1 * | 5/2005 | Dolansky | G05B 19/4069 700/182 |
| 2006/0184275 | A1 * | 8/2006 | Hosokawa | B25J 9/1666 700/245 |
| 2006/0212145 | A1 * | 9/2006 | Singh | G05B 19/41885 700/83 |
| 2006/0287769 | A1 * | 12/2006 | Yanagita | B25J 9/1669 700/245 |
| 2007/0005179 | A1 * | 1/2007 | Mccrackin | G06Q 10/047 700/213 |
| 2007/0299642 | A1 * | 12/2007 | Kondo | G06F 30/20 703/6 |
| 2008/0009957 | A1 * | 1/2008 | Gienger | B25J 9/1664 700/29 |
| 2008/0018287 | A1 * | 1/2008 | Ogawa | G05B 19/416 318/652 |
| 2008/0027704 | A1 | 1/2008 | Kephart et al. | |
| 2008/0091394 | A1 * | 4/2008 | Hahn | G05B 19/4069 703/7 |
| 2008/0243299 | A1 * | 10/2008 | Johnson | G05B 19/414 700/169 |
| 2009/0055019 | A1 * | 2/2009 | Stiehl | B25J 9/1656 700/249 |
| 2009/0089030 | A1 * | 4/2009 | Sturrock | G05B 17/02 703/7 |
| 2009/0259444 | A1 * | 10/2009 | Dolansky | G05B 19/4069 703/2 |
| 2009/0299509 | A1 * | 12/2009 | Diezel | G05B 19/4069 700/97 |
| 2009/0306952 | A1 * | 12/2009 | Kajitani | G06F 30/33 703/13 |
| 2010/0100365 | A1 * | 4/2010 | Moriyama | G06F 30/20 703/8 |
| 2010/0153073 | A1 * | 6/2010 | Nagatsuka | G05B 19/4069 703/1 |
| 2010/0298961 | A1 * | 11/2010 | Frisken | G05B 19/4069 700/103 |
| 2010/0332006 | A1 * | 12/2010 | Heuschmann | G05B 19/41885 700/98 |
| 2011/0173554 | A1 * | 7/2011 | Niles | G06F 3/04815 715/769 |
| 2012/0101613 | A1 * | 4/2012 | Kapoor | G05B 19/0426 700/97 |
| 2012/0166165 | A1 * | 6/2012 | Nogami | B25J 9/1671 703/6 |
| 2012/0215352 | A1 * | 8/2012 | Eberst | G05B 19/4083 700/253 |
| 2012/0239978 | A1 * | 9/2012 | Narutani | G06F 11/3612 714/32 |
| 2012/0290122 | A1 * | 11/2012 | Morfino | G05B 19/4069 700/184 |
| 2012/0330620 | A1 * | 12/2012 | Sullivan | G05B 19/4097 703/1 |
| 2013/0044115 | A1 | 2/2013 | Oyama et al. | |
| 2013/0050121 | A1 * | 2/2013 | Bruemmer | B25J 9/1666 345/173 |
| 2013/0124184 | A1 * | 5/2013 | Sakaguchi | G06F 30/20 703/22 |
| 2013/0218307 | A1 * | 8/2013 | Hoernicke | G05B 19/0426 700/81 |
| 2013/0275091 | A1 * | 10/2013 | Peterson | G06F 30/20 703/1 |
| 2013/0311154 | A1 * | 11/2013 | Atohira | G06T 1/00 703/6 |

(56) References Cited

U.S. PATENT DOCUMENTS

| | | | | |
|---|---|---|---|---|
| 2013/0317646 | A1* | 11/2013 | Kimoto | G05B 19/425 700/250 |
| 2014/0058565 | A1* | 2/2014 | Shimamura | G05B 19/056 700/275 |
| 2014/0088767 | A1* | 3/2014 | Shimamura | G05B 19/056 700/275 |
| 2014/0088949 | A1* | 3/2014 | Moriya | B25J 9/1612 703/22 |
| 2014/0214394 | A1* | 7/2014 | Inoue | G06F 30/20 703/13 |
| 2014/0236565 | A1* | 8/2014 | Kuwahara | B25J 9/1671 703/22 |
| 2015/0130794 | A1* | 5/2015 | Katsuda | G06T 15/20 345/419 |
| 2015/0239127 | A1* | 8/2015 | Barajas | B25J 9/1671 700/253 |
| 2015/0306768 | A1* | 10/2015 | Liang | G05B 19/406 703/2 |
| 2015/0338834 | A1* | 11/2015 | Furuta | G05B 17/02 700/31 |
| 2016/0000511 | A1* | 1/2016 | Hoffmann | B25J 9/1628 606/130 |
| 2016/0136815 | A1* | 5/2016 | Linnell | B25J 9/1676 700/255 |
| 2016/0229052 | A1* | 8/2016 | Touma | B25J 9/161 |
| 2016/0311112 | A1* | 10/2016 | Gustafsson | B25J 9/1682 |
| 2017/0021501 | A1* | 1/2017 | Kimoto | B25J 9/1671 |
| 2017/0106537 | A1* | 4/2017 | Chizeck | B25J 9/1689 |
| 2017/0120447 | A1* | 5/2017 | Inoue | B25J 9/1666 |
| 2017/0136623 | A1* | 5/2017 | Negishi | B25J 9/163 |
| 2017/0227945 | A1* | 8/2017 | Wang | G06F 30/20 |
| 2017/0236262 | A1 | 8/2017 | Ohnuki et al. | |
| 2017/0242423 | A1* | 8/2017 | Oya | G06T 11/60 |
| 2017/0274532 | A1* | 9/2017 | Nishitani | G06F 30/17 |
| 2017/0277162 | A1* | 9/2017 | Nakajima | G05B 19/402 |
| 2017/0308057 | A1* | 10/2017 | Kreidler | G05B 19/4069 |
| 2018/0036883 | A1* | 2/2018 | Nishitani | B25J 9/1671 |
| 2018/0060459 | A1* | 3/2018 | English | B25J 9/1671 |
| 2018/0113433 | A1* | 4/2018 | Ishiwari | G05B 19/404 |
| 2018/0121578 | A1* | 5/2018 | Atohira | B25J 9/1671 |
| 2018/0126554 | A1* | 5/2018 | Eickhorst | B25J 9/1671 |
| 2018/0151076 | A1* | 5/2018 | Hirotsu | G08G 1/166 |
| 2018/0210434 | A1* | 7/2018 | Iwatake | B25J 13/085 |
| 2018/0233062 | A1* | 8/2018 | Vatcher | A63G 31/16 |
| 2018/0297202 | A1* | 10/2018 | Nishitani | B25J 9/1671 |
| 2018/0349702 | A1* | 12/2018 | Gildert | B25J 19/023 |
| 2019/0001490 | A1* | 1/2019 | Washizu | B25J 9/1651 |
| 2019/0094831 | A1* | 3/2019 | Nakano | G05B 19/05 |
| 2019/0101893 | A1* | 4/2019 | Oya | B25J 9/1671 |
| 2019/0171189 | A1* | 6/2019 | Petruzzi | G05B 19/4163 |
| 2019/0266296 | A1* | 8/2019 | Aizawa | G05B 19/4097 |
| 2019/0291277 | A1* | 9/2019 | Oleynik | B25J 9/1664 |
| 2019/0302705 | A1* | 10/2019 | Ito | G05B 13/02 |
| 2019/0308322 | A1* | 10/2019 | Nishitani | G06F 30/20 |
| 2019/0329405 | A1* | 10/2019 | Atohira | B25J 9/1605 |
| 2019/0384252 | A1* | 12/2019 | Wang | G05B 19/402 |
| 2020/0042336 | A1* | 2/2020 | Hazan | G06F 9/455 |
| 2020/0086483 | A1* | 3/2020 | Li | B25J 9/163 |
| 2020/0094408 | A1* | 3/2020 | Yui | B25J 9/1664 |

* cited by examiner

INFORMATION PROCESSING APPARATUS FOR ESTIMATING BEHAVIOUR OF DRIVING DEVICE THAT DRIVES CONTROL TARGET, INFORMATION PROCESSING METHOD AND COMPUTER READABLE RECORDING MEDIUM

CROSS-REFERENCE TO RELATED APPLICATION

This application claims the priority benefit of Japan Patent Application No. 2017-186026, filed on Sep. 27, 2017. The entirety of the above-mentioned patent application is hereby incorporated by reference herein and made a part of this specification.

BACKGROUND

Technical Field

The disclosure relates to an information processing apparatus, an information processing method and a program, and more particularly relates to an information processing apparatus, an information processing method and a program for estimating the behavior of a driving device that drives a control target.

Description of Related Art

In the field of FA (factory automation), various automatic control techniques have been used extensively. In the stage of designing or examining the system to which such automatic control techniques are applied, it is necessary to evaluate the performance of the system beforehand. In regard to such needs, a method has been proposed for carrying out the evaluation based on data that is obtained by simulating movement of the target to be evaluated. For example, International Publication No. 2016/181455 (Patent Document 1) discloses a configuration for storing the simulation result of motion of the target in a file and feeding frames to read the target state from the file for display.

In addition, Japanese Laid-Open No. 2017-97426 (Patent Document 2) discloses a simulation apparatus for reproducing the behavior of a system. Patent Document 2 discloses in paragraph 0073 that the simulation apparatus uses sequentially stored trace data to reproduce the behavior of the system and appropriately changes the time interval, update interval, etc. of the reproduced system behavior in accordance with the user's operation.

When designing the control program of an actual machine that is associated with the FA provided in the production line, the user verifies a series of movements of the machine controlled by execution of the control program and corrects the control program based on the verification result. Such verification can be easily confirmed by using an actual machine. However, when it is not possible to use an actual machine, the user executes a simulation program to estimate the movement of the actual machine by calculation. When executing the simulation program, if the user wants to check the movement of a predetermined point among a series of movements, the user has to wait until the calculation result corresponding to the predetermined point is outputted. Thus, the verification takes time. Therefore, there are needs for variable adjustment of the time required for verification.

Regarding this, in Patent Documents 1 and 2, once all the simulation results or trace data is stored, at the time of display, the stored contents are displayed on the screen by controlling frame feeding or the display interval, etc. Therefore, according to the methods of Patent Document 1 and Patent Document 2, it is necessary for the user to wait until calculation of all the simulation results or trace data is completed, which cannot meet the aforementioned needs.

SUMMARY

An information processing apparatus according to an embodiment of the disclosure includes: a first emulator estimating a behavior of a first driving device for driving a first control target that moves on a first target trajectory; a second emulator estimating a behavior of a second driving device for driving a second control target that moves on a second target trajectory; and a visualization module generating drawing data for visualizing and drawing movement of the first control target and movement of the second control target in the same three-dimensional virtual space. The first emulator calculates a first command value that controls the first driving device in each control cycle according to a calculation command from the information processing apparatus, the second emulator calculates a second command value that controls the second driving device in each control cycle according to the calculation command, the visualization module generates the drawing data by using the first command value and the second command value, and the calculation command includes a movement amount variable command that instructs to calculate a command value for setting a movement amount of the movement in each control cycle variable.

According to an embodiment of the disclosure, a processing method performed by an information processing apparatus includes: estimating a behavior of a first driving device for driving a first control target that moves on a first target trajectory; estimating a behavior of a second driving device for driving a second control target that moves on a second target trajectory; and generating drawing data for visualizing and drawing movement of the first control target and movement of the second control target in the same three-dimensional virtual space, wherein when estimating the behavior of the first driving device, a first command value that controls the first driving device in each control cycle is calculated according to a calculation command from the information processing apparatus, when estimating the behavior of the second driving device, a second command value that controls the second driving device in each control cycle is calculated according to the calculation command, when generating the drawing data, the drawing data is generated by using the first command value and the second command value, and the calculation command includes a movement amount variable command that instructs to calculate a command value for setting a movement amount of the movement in each control cycle variable.

A program according to an embodiment of the disclosure enables a computer to execute the processing method performed by the above-mentioned information processing apparatus.

DESCRIPTION OF THE EMBODIMENTS

Figure 1:
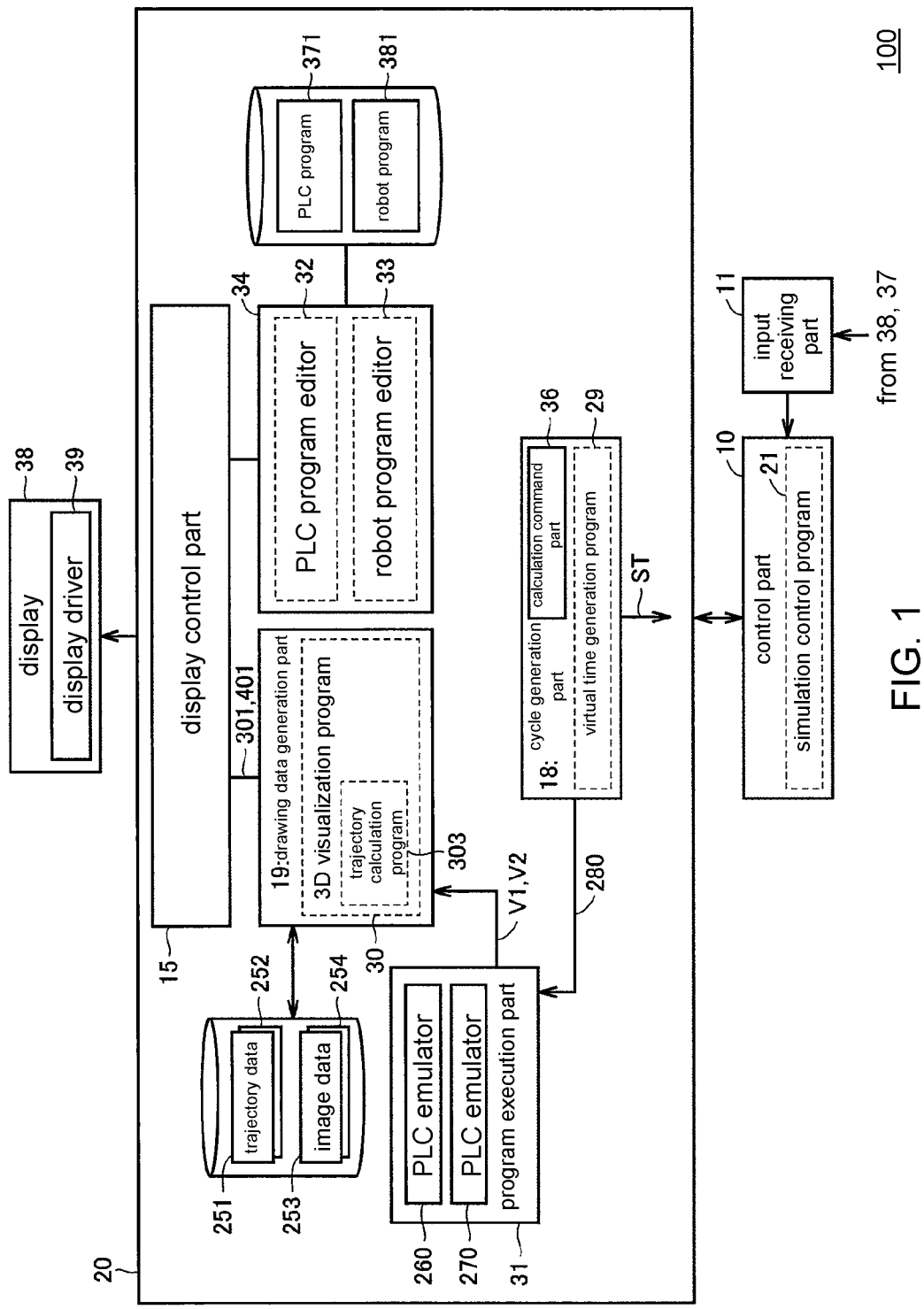
FIG. 1 is a schematic diagram showing an exemplary application scenario of the information processing apparatus 100 according to the present embodiment.

In view of the above, the disclosure provides an environment, which makes it possible to change the time required for estimation of a series of movements of a control target when estimating the series of movements.

According to the above disclosure, the first and second emulators calculate the command values for setting the movement amount of the control target in each control cycle variable according to the movement amount variable command. Therefore, when estimating a series of movements of the control target, it is possible to change the time required for estimating the series of movements.

In the above disclosure, the calculation command includes a ×1 calculation command that instructs to calculate a command value for setting the movement amount in each control cycle equal to a predetermined unit movement amount.

According to the above disclosure, it is possible to calculate the command value for fixing the movement amount in each control cycle to the unit movement amount.

In the above disclosure, the movement amount variable command includes a ×N calculation command that instructs to calculate a command value for setting the movement amount in each control cycle to N times (where N>1) the unit movement amount.

According to the above disclosure, it is possible to calculate the command value for setting the movement amount in each control cycle to N times the unit movement amount. Thus, when estimating a series of movements of the control target, the movement amount in each control cycle can be increased. Therefore, compared with the case of fixing the movement amount to the unit movement amount, it is possible to shorten the time required for estimating the series of movements, and to reduce the number of times of calculation to reduce the load on calculation of the information processing apparatus.

In the above disclosure, the movement amount variable command includes a ×1/N calculation command that instructs to calculate a command value for setting the movement amount in each control cycle to 1/N times (where N>1) the unit movement amount.

According to the above disclosure, it is possible to calculate the command value for setting the movement amount in each control cycle to 1/N times the unit movement amount. Thus, when estimating a series of movements of the control target, the movement amount in each control cycle can be reduced, and compared with the case of fixing the movement amount to the unit movement amount, it is possible to draw movement of the first control target and movement of the second control target at a low speed.

In the above disclosure, the information processing apparatus detects a first change amount of the first command value between control cycles and a second change amount of the second command value between control cycles, and outputs the ×N calculation command in a section corresponding to a common elapsed time since a time of start of emulation in the first target trajectory and the second target trajectory and a section where both the first change amount and the second change amount are equal to or less than a threshold value.

According to the above disclosure, the ×N calculation command is outputted in the section where the change amounts between the control cycles, with respect to the first command value and the second command value for moving the first control target and the second control target, are both equal to or less than the threshold value, that is, both are estimated to move at constant speed. As a result, in the period when there is no change in the constant speed movement, that is, in the period when movement confirmation is not hindered, the movement amount in each control cycle in the drawing can be increased.

In the above disclosure, the drawing data includes data that indicates positions of the first control target and the second control target in the three-dimensional virtual space, and the information processing apparatus outputs the movement amount variable command if a relative positional relationship between the first control target and the second control target in the three-dimensional virtual space satisfies a predetermined condition.

According to the above disclosure, it is possible to output the movement amount variable command according to the relative positional relationship between the first control target and the second control target in the three-dimensional virtual space.

In the above disclosure, the information processing apparatus includes a receiving part receiving input of a user for the information processing apparatus, and outputs the movement amount variable command according to the input received by the receiving part.

According to the above disclosure, the user can enable the information processing apparatus to output the movement amount variable command by input to the information processing apparatus.

In the above disclosure, the information processing apparatus detects a first change amount of the first command value between control cycles and a second change amount of the second command value between control cycles, and outputs a warning if the first change amount or the second change amount exceeds a change amount threshold value.

According to the above disclosure, a warning is outputted when the change amount of the first command value or the second command value between the control cycles exceeds the change amount threshold value. As a result, the warning is outputted when the command value calculated by the movement amount variable command is likely to cause an excessive change in the movement amount in each control cycle.

In the above disclosure, the drawing data includes data that indicates positions of the first control target and the second control target in the three-dimensional virtual space, and the information processing apparatus outputs a warning if a change amount of a moving distance between control cycles based on the position of the first control target in the three-dimensional virtual space or a change amount of a moving distance between control cycles based on the position of the second control target in the three-dimensional virtual space exceeds a distance threshold value.

According to the above disclosure, a warning is outputted when the command value calculated by the movement amount variable command is likely to cause an excessive change in the moving distance in each control cycle.

In the above disclosure, the information processing apparatus further includes a timer outputting a variable virtual time, wherein the control cycle indicates a cycle that uses the virtual time as a scale.

According to the above disclosure, the control cycle can be variable corresponding to the cycle of calculation of the first emulator and the second emulator.

According to the above disclosure, the first and the second emulators calculate the command values for setting the movement amount of the control target in each control cycle variable according to the movement amount variable command. Therefore, when estimating a series of movements of the control target, it is possible to change the time required for estimating the series of movements.

According to the above disclosure, the computer is enabled to execute the program for the first and the second emulators calculate the command values for setting the movement amount of the control target in each control cycle variable according to the movement amount variable command. When the program is executed, in the case of estimating a series of movements of the control target, it is possible to change the time required for estimating the series of movements.

According to the disclosure, an environment can be provided, which makes it possible to change the time required for estimation of a series of movements of a control target when estimating the series of movements.

Hereinafter, embodiments according to the disclosure will be described with reference to the drawings. In the following description, the same parts and components will be denoted by the same reference numerals. They also have the same names and functions. Therefore, detailed description of these parts and components will not be repeated. The embodiments and modification examples described below may be combined selectively as appropriate.

<A. Example of Application>

First, an exemplary scenario where the disclosure is used is described with reference to FIG. 1. FIG. 1 is a schematic diagram showing an exemplary application scenario of an information processing apparatus 100 according to the present embodiment. The information processing apparatus 100 according to the present embodiment estimates a behavior (for example, the rotation amount (including angle and direction) of a motor) of each driving device (for example, an actuator such as a servo motor), which drives any of a first control target and a second control target, and generates drawing data 301 and 401 for drawing the movement of each control target that is controlled according to the estimated behavior. The first control target is driven to move on a first target trajectory and the second control target is driven to move on a second target trajectory. The first control target corresponds to a stage and the second control target corresponds to a robot, for example. However, the control targets are not limited thereto and may be appropriately selected from manufacturing apparatuses or facilities that can serve as control targets.

As shown in FIG. 1, the information processing apparatus 100 includes a first emulator (for example, PLC (programmable controller) emulator 260), a second emulator (for example, robot emulator 270), and a visualization module (for example, 3D visualization program 30). The first emulator estimates a behavior of a first driving device for driving the first control target. The second emulator estimates a behavior of a second driving device for driving the second control target. The visualization module generates the drawing data 301 and 401 for visualizing and drawing movement of the first control target and movement of the second control target in the same virtual space.

The first emulator calculates a first command value V1, which controls the first driving device in each control cycle, according to a calculation command 280 from the information processing apparatus 100. The second emulator calculates a second command value V2, which controls the second driving device in each of the above-mentioned control cycle, according to the calculation command 280. The calculation command 280 includes a command instructing to calculate a command value for setting the movement amount in each control cycle in the movement on the first target trajectory and the second target trajectory described above variable. The visualization module generates the above-mentioned drawing data 301 and 401 by using the first command value and the second command value calculated in this manner.

The first emulator corresponds to a program, e.g., an emulation program including a plurality of instructions of the PLC program 371, which controls the first driving device as an actual machine. The second emulator corresponds to a program, e.g., an emulation program including a plurality of instructions of the robot program 381, which controls the second driving device as an actual machine.

As described above, in the present embodiment, with use of the calculation command 280, the movement amount in each control cycle can be made variable rather than fixed. Therefore, it is possible to adjust the time required for the process of estimating the behaviors of the first driving device and the second driving device in the movement on the first target trajectory and the second target trajectory, that is, to shorten the time to perform emulation at a high speed or to lengthen the time to perform emulation at a low speed.

For example, in the case where the calculation command 280 is for shortening the required time, it is possible to shorten the time required for acquiring the calculation result of the command value corresponding to a predetermined point on the first or second target trajectory so that the user can shorten the time required for verifying the behavior. Moreover, in the case where the calculation command 280 is for lengthening the required time, it is possible to slow down drawing of the drawing data that uses the command value calculated at the predetermined point (reduce the movement amount per drawing cycle) so that the user can confirm in detail the behavior at the predetermined point from the drawing content.

In this specification, the "command value" represents a numerical value, e.g., position, speed, acceleration, jerk, angle, angular speed, angular acceleration, and angular jerk, with respect to the driving device (including an actuator such as a servo motor) as a command, for example.

Hereinafter, a more detailed configuration and processing of the information processing apparatus 100 according to the present embodiment will be described as a more specific application example of the disclosure.

<B. Example of Overall Configuration of Control System>

The information processing apparatus 100 according to the present embodiment estimates the behavior of a driving device for driving a plurality of machines, which are control targets provided for a production line. A movable stage 400 and a robot 300 for gripping and moving a workpiece W on the stage 400 are shown as examples of such control targets. Nevertheless, the machines serving as the control targets are not limited thereto. An example of the environment where the machines serving as control targets are provided as actual machines will be described below.

Figure 2:
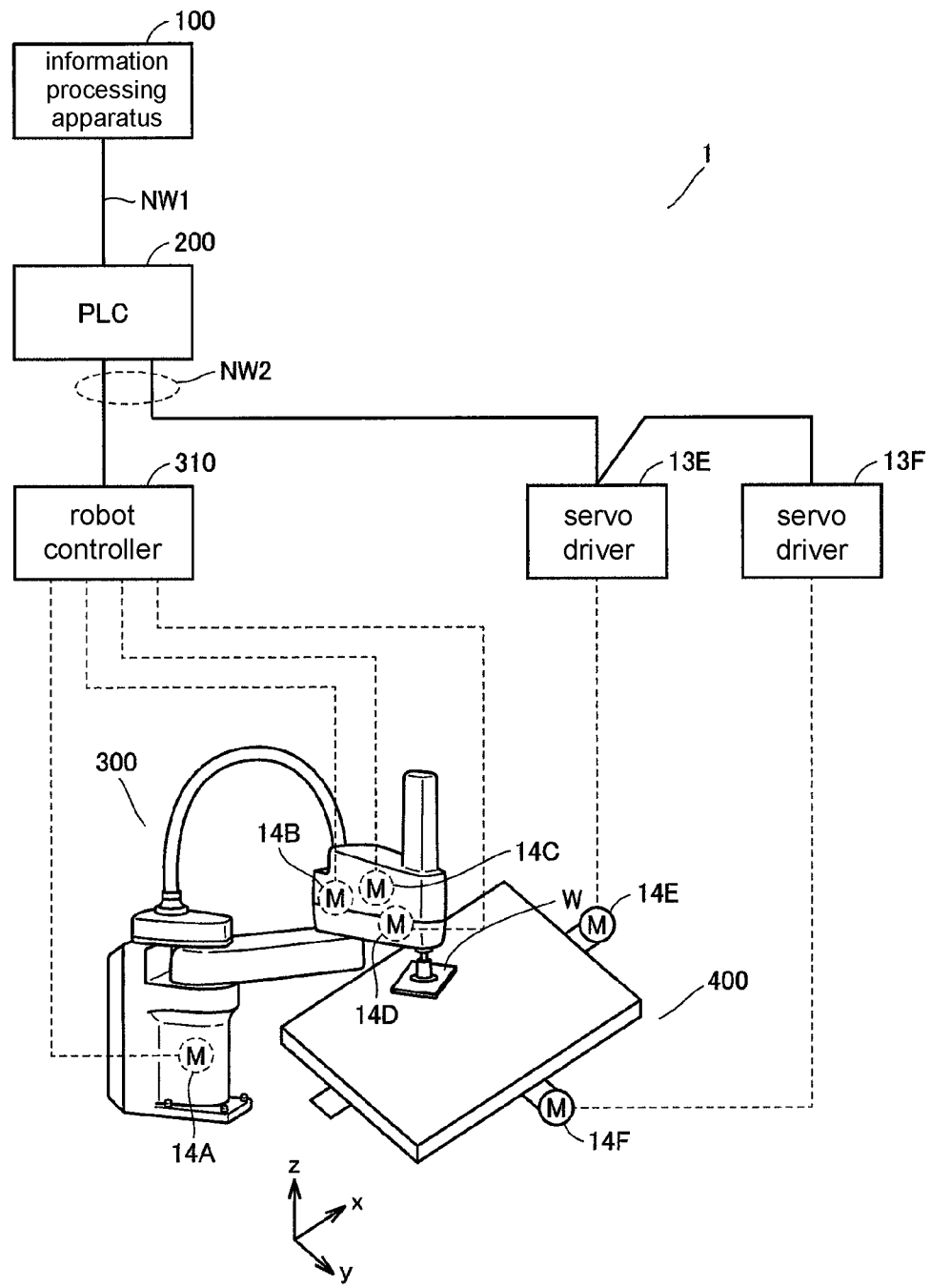
FIG. 2 is a schematic diagram showing a configuration example of the online control system 1 provided in a production line according to the present embodiment.

FIG. 2 is a schematic diagram showing a configuration example of an online control system 1 provided in a production line according to the present embodiment. Referring to FIG. 2, the online control system 1 (hereinafter, simply referred to as control system 1) includes the information processing apparatus 100, a PLC 200 which is an example of the controller, a robot controller 310 which controls the robot 300, and servo drivers 13E and 13F. The information processing apparatus 100 includes terminal devices, such as a PC (personal computer) and a tablet terminal, for example. The servo drivers 13E and 13F (hereinafter, also collectively referred to as "servo drivers 13") drive the corresponding servo motors 14E and 14F.

The information processing apparatus 100 is connected to the PLC 200 via a field network NW1. For example, EtherNET (registered trademark) is adopted as the field network NW1. Nevertheless, the field network NW1 is not necessarily EtherNET and may use any communication means. The PLC 200 and the information processing apparatus 100 may be directly connected by a signal line, for example. The information processing apparatus 100 provides an environment for designing a control program that is for controlling machines of the robot 300 and the stage 400. The control program designed on the information processing apparatus 100 is sent to the PLC 200 via the field network NW1.

The PLC 200 executes the designed control program and gives target values to the robot controller 310 or the servo drivers 13 respectively according to the execution result, so as to control the targets, which include the robot 300 and the stage 400.

The robot controller 310 and the servo drivers 13 are connected to the PLC 200. The PLC 200, the robot controller 310, and the servo drivers 13 are connected by a daisy chain via a field network NW2. EtherCAT (registered trademark) is adopted as the field network NW2, for example. Nevertheless, the field network NW2 is not necessarily EtherCAT and may use any communication means. Further, the connection form is not limited to the above-mentioned daisy chain, and other connection forms such as tree connection or star connection may also be used.

The robot 300 and the stage 400 cooperate with each other to move the workpiece W. In order to simplify the description, movement of the workpiece W will be described here, but the disclosure is not limited to the movement. For example, it may be processing of the workpiece W performed by the robot 300 on the stage 400.

FIG. 2 shows servo motors 14A to 14D (hereinafter, also collectively referred to as "servo motors 14") provided in the robot 300 and a robot controller 310 that drives the servo motors 14 as examples of the drive devices of the robot 300. Likewise, the servo drivers 13 that drive the servo motors 14E and 14F (hereinafter, also collectively referred to as "servo motors 14") provided in the stage 400 are shown as examples of the drive devices of the stage 400. As the robot 300 is driven, the behavior of the robot 300 changes in a three-dimensional space of X, Y, and Z axes that are orthogonal to one another. As the stage 400 is driven, the behavior of the stage 400 is defined in the same three-dimensional space as the robot 300, but is defined in the plane of X and Y axes therein.

The drive device is not limited to the servo driver, and a corresponding drive device may be adopted according to the motor that serves as the driven device. For example, in the case of driving an induction motor or a synchronous motor, an inverter drive or the like may be adopted as the drive device.

The robot controller 310 drives the servo motors 14 of the robot 300. An encoder (not shown) is disposed on a rotation shaft of the servo motor 14. The encoder outputs the position (rotation angle), rotation speed, cumulative rotation speed, etc. of the servo motor to the robot controller 310 as feedback values of the servo motor 14.

Likewise, the servo drivers 13 drive the servo motors 14 of the stage 400. An encoder (not shown) is disposed on a rotation shaft of the servo motor 14. The encoder outputs the position (rotation angle), rotation speed, cumulative rotation speed, etc. of the servo motor to the servo driver 13 as feedback values of the servo motor 14.

<C. Control of Robot and Stage>

Control of the robot 300 and the stage 400 in the control system 1 will be described below. As described above, the robot 300 and the stage 400 have movable parts that are movable by a plurality of driving shafts. Each of these driving shafts is driven by one servo motor. Specifically, the robot 300 has a plurality of arms that are driven through rotation of the servo motors 14 (servo motors 14A to 14D). The servo motors 14 rotate to drive the corresponding arms respectively. As the robot controller 310 controls driving of the servo motors 14, each arm moves three-dimensionally. By movement of each arm, movement of the robot 300 is realized. Likewise, the stage 400 also moves through rotation of the servo motors 14 (servo motors 14E and 14F). The movement amount (direction and distance of the movement) of the robot 300 or the stage 400 is determined by the rotation amount (direction and angle of the rotation) of the servo motors 14.

Figure 3:
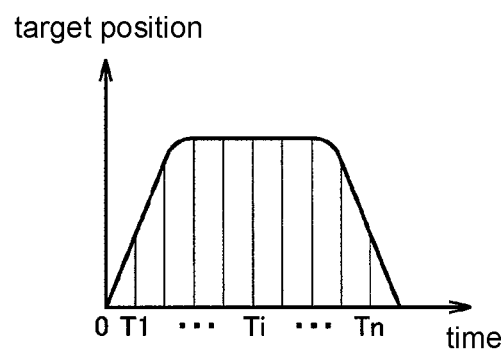
FIG. 3 is a diagram illustrating the target position of each axis of the robot 300.

In the present embodiment, each arm of the robot 300 is associated with a virtual axis, and movement of the robot 300 is determined from the position of each axis. FIG. 3 is a diagram illustrating a target position of each axis of the robot 300. Referring to FIG. 3, the target position of each axis changes chronologically so that the movement of the robot 300 shows an action to be achieved (hereinafter also referred to as target action). Specifically, each arm of the robot 300 is driven according to the target position that changes chronologically in FIG. 3, so that the speed and trajectory of movement of each arm change to become the speed and trajectory in accordance with the target.

The target position for defining the target action of the robot 300, as shown in FIG. 3, is stored in the PLC 200 in advance. The robot controller 310 receives the target position from the PLC 200, determines the rotation amount of each servo motor based on the received target position, and outputs a command value specifying the determined rotation amount to each of the servo motors 14. The target position may be stored only in the robot controller 310.

Figure 4:
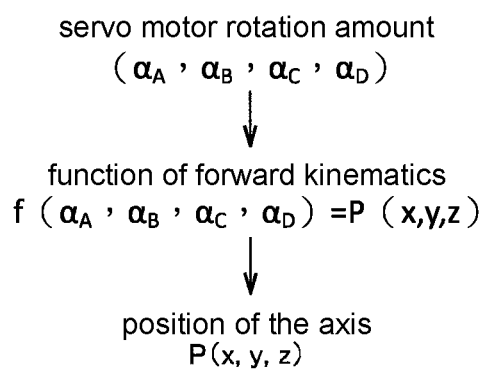
FIG. 4 is a diagram schematically showing a process of calculating the position, in the three-dimensional virtual space, of the axis corresponding to each arm of the robot 300 according to the present embodiment.

FIG. 4 is a diagram schematically showing a process of calculating the position, in the three-dimensional virtual space, of the axis corresponding to each arm of the robot 300 according to the present embodiment. Referring to FIG. 4, the rotation amount of the servo motor 14A is represented by $\alpha_A$, the rotation amount of the servo motor 14B is represented by $\alpha_B$, the rotation amount of the servo motor 14C is represented by ac, and the rotation amount of the servo motor 14D is represented by $\alpha_D$. By calculating the servo motor rotation amounts ($\alpha_A$, $\alpha_B$, $\alpha_C$, $\alpha_D$) using a predetermined function, the servo motor rotation amounts ($\alpha_A$, $\alpha_B$, $\alpha C_C$, $\alpha_D$) can be converted into a position in the three-dimensional virtual space of xyz as shown in FIG. 3. FIG. 4 shows three-dimensional coordinates P(x, y, z), which is the position of the axis of the arm that catches the workpiece W in the three-dimensional virtual space, for example, and the three-dimensional coordinates corresponding to the other axes can be calculated in the same manner. Therefore, the movement of the robot 300 in the three-dimensional virtual space can be shown by chronological change of the three-dimensional coordinates P(x, y, z) of each arm.

Further, to simplify the description, in the present embodiment, the three-dimensional coordinates P(x, y, z) of the axis of the arm that catches the workpiece W are also used to detect "interference" in the three-dimensional virtual space which will be described later. The three-dimensional coordinates P(x, y, z) of another axis or a combination of the three-dimensional coordinates P(x, y, z) of two or more axes may be used for detection of "interference".

Like the robot 300, in order that the movement of the stage 400 shows the target action, the speed and trajectory of movement of the stage 400 also change chronologically so as to show the target position. The target position of the stage 400 is stored in the PLC 200 in advance.

The servo driver 13 determines the rotation amount of each servo motor based on the target position from the PLC 200 and outputs a command value specifying the determined rotation amount to each of the servo motors 14. For the stage 400, by calculating the rotation amount of each servo motor using a predetermined function, it can be converted into three-dimensional coordinates Q(x, y, 0) in the same three-dimensional virtual space as the robot 300. The movement of the stage 400 in the three-dimensional virtual space can be shown by the chronological change of the three-dimensional coordinates Q(x, y, 0).

Here, since the stage 400 moves along a plane, the z axis of the three-dimensional coordinates Q is fixed to 0. Nevertheless, it may also be other fixed values.

The trajectory of movement of the stage 400 according to such a target position is an embodiment of the "first target trajectory". In addition, the trajectory of movement of the robot 300 according to the target position is an embodiment of the "second target trajectory".

<D. Configuration of Information Processing Apparatus 100>

Figure 5:
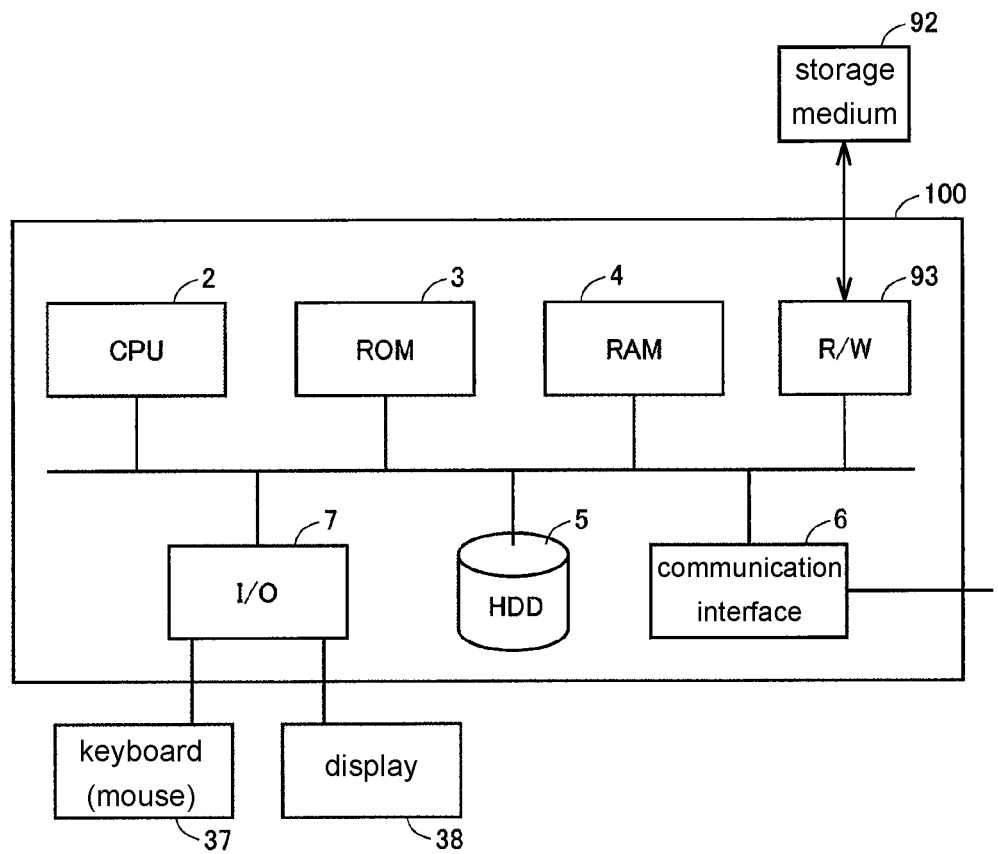
FIG. 5 is a diagram schematically showing a configuration of the information processing apparatus 100 according to the present embodiment.

FIG. 5 is a diagram schematically showing a configuration of the information processing apparatus 100 according to the present embodiment. In the control system 1 of FIG. 2, when the environment where the robot 300 and the stage 400 are controlled by the PLC 200 as actual machines is online, the information processing apparatus 100 of FIG. 5 simulates the control system 1 offline.

The information processing apparatus 100 is a computer system that includes a CPU (central processing unit) 2 and a storage part that stores a program and data, and operates according to the program. The storage part includes a ROM (read only memory) 3, a RAM (random access memory) 4, and a HDD (hard disk drive) 5. The information processing apparatus 100 further includes a communication interface 6 and an I/O (input/output) interface 7. The information processing apparatus 100 also includes a keyboard 37 and a display 38. The keyboard 37 receives input, including an instruction to the information processing apparatus 100, from the user. To receive the input, the information processing apparatus 100 may include other devices such as a mouse. The information processing apparatus 100 includes an R/W (reader/writer) device 93 that detachably attaches an external storage medium 92 and reads/writes a program and/or data from/to the attached storage medium.

The communication interface 6 is an interface for the information processing apparatus 100 to communicate with an external device including the PLC 200.

The I/O interface 7 is an interface for input to the information processing apparatus 100 or output from the information processing apparatus 100. As shown in FIG. 5, the I/O interface 7 is connected to the keyboard 37 and the display 38 and receives information inputted to the keyboard 37 by the user. Also, a processing result of the information processing apparatus 100 is outputted to the display 38. The display 38 includes an LCD (liquid crystal display) or an organic EL (electro luminescence) display, and displays a video or an image according to a video signal or an image signal outputted from the information processing apparatus 100.

<E. Configuration of Offline System 20>

Figure 6:
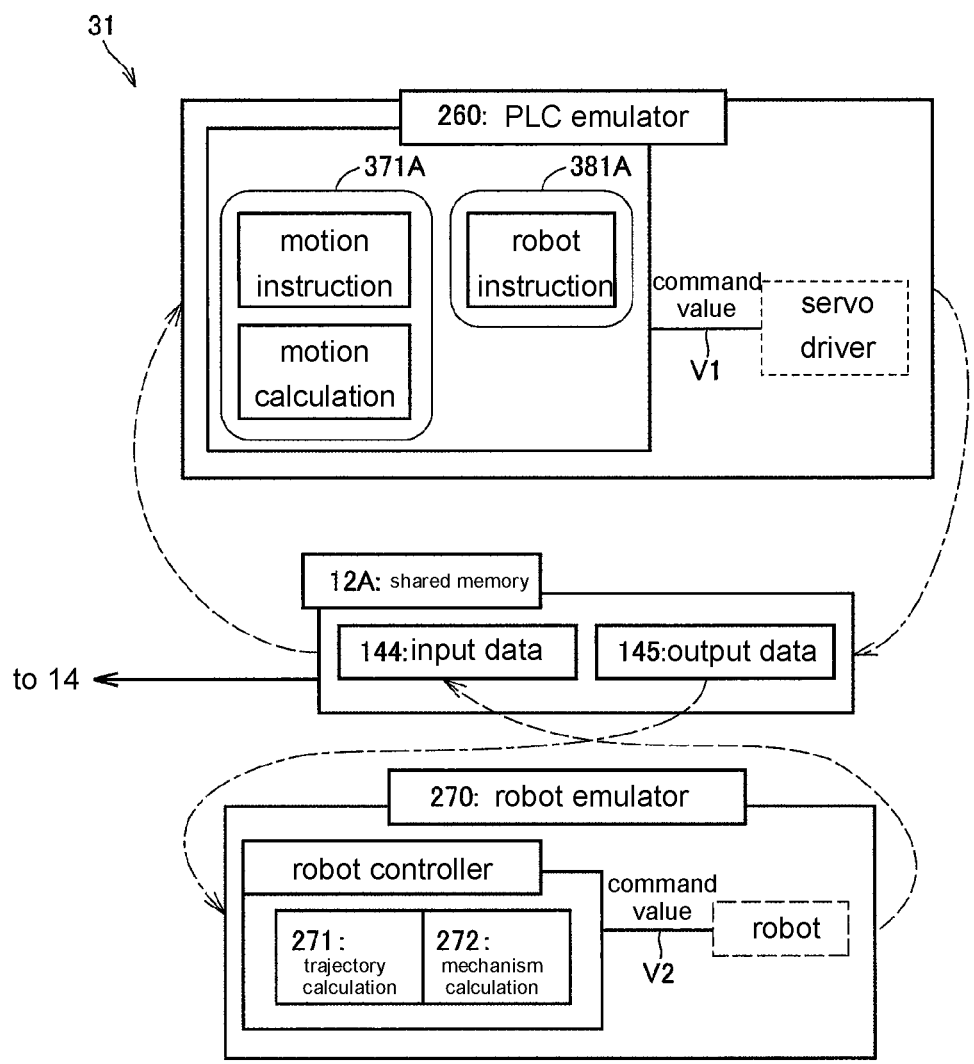
FIG. 6 is a diagram showing a configuration example of the program execution part 31 of FIG. 1.

Referring to FIG. 1, a configuration example of an offline system 20 according to the present embodiment will be described in association with the peripheral parts. FIG. 6 is a diagram showing a configuration example of a program execution part 31 of FIG. 1. The offline system 20 simulates the control system 1. In this simulation, a plurality of instructions included in the control programs of the robot 300 and the stage 400 are executed by emulators, so as to estimate the behaviors of the servo motors 14 that drive the robot 300 and the stage 400.

Referring to FIG. 1, the information processing apparatus 100 includes a control part 10 for controlling each part of the information processing apparatus 100, an input receiving part 11 for receiving the user's input to the information processing apparatus 100, and the offline system 20. The display 38 is connected to the offline system 20. The display 38 includes a display driver 39 which generates image data to be displayed according to display control data and drives the display 38 according to the image data. The input receiving part 11 receives user input made through an operation of the keyboard 37 or an operation of an icon, etc. displayed by the display 38. The control part 10 is realized by execution of a simulation control program 21 performed by the CPU 2. The control part 10 controls the offline system 20 according to the user's instruction received via the input receiving part 11.

The offline system 20 is configured to include programs and data, and the CPU 2 executes a program according to a command from the control part 10, by which the offline system 20 is realized. In addition, when the result of processing performed by the offline system 20 is displayed on the display 38, the processing result is converted into display control data and outputted to the display driver 39. The display driver 39 drives the display 38 according to the image data in accordance with the display control data. As a result, an image presenting the result of processing of the information processing apparatus 100 and the offline system 20 is displayed on the screen of the display 38.

(E-1. Configuration of Offline System 20)

A configuration of the offline system 20 will be described below. The programs and data for realizing parts of the offline system 20 have been stored in the storage part that includes ROM 3, RAM 4, HDD 5, etc., for example.

Referring to FIG. 1, the offline system 20 includes the program execution part 31 which is the subject for executing the PLC emulator 260 and the robot emulator 270, and a drawing data generation part 19 which generates drawing data including the 3D visualization program 30. These are provided as program modules, for example.

The offline system 20 may further include a display control part 15 for generating display control data, a cycle generation part 18 including a timer for outputting a virtual time, and a program editing part 34 for editing a control program.

The display control part 15 generates the display control data from the drawing data, etc. and outputs it to the display driver 39. The display driver 39 drives the display 38 according to the display control data from the display control part 15. As a result, an image in accordance with drawing data is displayed on the screen.

The cycle generation part 18 generates a signal ST indicating the virtual time and outputs the generated signal ST to each part of the offline system 20. The virtual time indicated by the signal ST is variable. Each part operates in synchronization with a cycle which uses the virtual time indicated by the signal ST as a scale. In the present embodiment, the cycle that uses the virtual time as a scale includes the control cycle described above. The cycle generation part 18 includes a calculation command part 36 that generates a calculation command 280 according to an instruction from the control part 10 and outputs it to the program execution part 31. The calculation command 280 generated by the calculation command part 36 includes, for example, a ×1 calculation command, a ×N calculation command, and a ×1/N calculation command which will be described later.

Further, referring to FIG. 1, the offline system 20 includes trajectory data 251 and 252 and image data 253 and 254 in association with the drawing data generation part 19. In addition, the offline system 20 includes the robot program 381 which is a control program of the robot 300, and the PLC program 371 which is a control program of the stage 400 in association with the program editing part 34. The robot program 381 and the PLC program 371 are stored in the storage part. In the case where each part of FIG. 1 is constituted by a program, these programs and related data are stored in the ROM 3, RAM 4, HDD 5, etc., for example. The CPU 2 executes the stored programs.

(E-2. Emulation Performed by Program Execution Part)

The program execution part 31 corresponds to the subject of executing the PLC emulator 260 and the robot emulator 270, that is, an execution engine. Referring to FIG. 6, the program execution part 31 includes the PLC emulator 260 that emulates the control program of the PLC 200 and the servo drivers 13, the robot emulator 270 that emulates the control program of the robot controller 310, and a shared memory 12A. Data exchange between the PLC emulator 260 and the robot emulator 270 is realized by using the shared memory 12A. Data exchange between the PLC emulator 260 and the robot emulator 270 via the shared memory 12A corresponds to data exchange in the communication between the PLC 200, the servo drivers 13, and the robot controller 310 through EtherCAT of the field network NW2.

The PLC emulator 260 is a program for estimating the behaviors of the robot 300 and the stage 400, and corresponds to an emulation program that includes a plurality of instructions included in the PLC program 371 and the robot program 381. These instructions include an instruction group 371A which includes a motion instruction and a motion calculation instruction for controlling the behavior of the stage 400 included in the PLC program 371, and an instruction group 381A which includes a plurality of robot instructions for controlling the behavior of the robot 300 included in the robot program 381. The instruction group 381A and the instruction group 371A may also include other instructions such as an arithmetic operation instruction. The PLC program 371 is, for example, a program described in a cyclic execution type language (for example, a ladder language), and the robot program 381 is, for example, a program described in a sequential execution type language (for example, an interpreter language). Therefore, the program execution part 31 has an emulator execution engine for executing programs of these different languages.

Every time each instruction of the instruction groups 381A and 371A of the PLC emulator 260 is executed based on input data 144 of the shared memory 12A, the above-mentioned command value V1 for the servo motor is generated and stored in the shared memory 12A as output data 145.

In addition, the robot emulator 270 corresponds to an emulation program that includes an instruction group included in the program of the robot controller 310. This instruction group includes one or more trajectory calculation instructions 271 for calculating the target trajectory of the robot 300 based on the output data of the shared memory 12A, and one or more mechanism calculation instructions 272 for calculating the command value V2 of each axis based on the calculated trajectory.

When the instruction group of the robot emulator 270 is executed based on the output data 145 of the shared memory 12A, the above-mentioned command value V2 of each axis of the robot 300 is generated and stored in the shared memory 12A as the input data 144.

Thus, the command values generated by the PLC emulator 260 and the robot emulator 270 can show the estimated behaviors of the servo motors of the robot 300 and the stage 400. Furthermore, the PLC emulator 260 and the robot emulator 270 respectively calculate new command values based on the command value calculated by the other. Therefore, the mutually cooperative operations of the robot 300 and the stage 400 can be shown by the behaviors of the servo motors that are estimated by the command values calculated in this manner.

(E-3. Generation of Drawing Data)

Referring to FIG. 1, the drawing data generation part 19 executes the 3D visualization program 30 that generates 3D (3-dimensions) drawing data including a trajectory calculation program 303. The 3D visualization program 30 is an embodiment of the "visualization module". When the 3D visualization program 30 is executed, the drawing data generation part 19 generates drawing data 301 and 401 drawing the emulated movements of the robot 300 and the stage 400 on the display 38 based on the trajectory data 251 and 252 and the image data 253 and 254 representing the robot 300 and the stage 400. The image data 253 and 254 representing the robot 300 and the stage 400 includes CAD (computer-aided design) data, etc.

By performing calculation on the input data 144 of the shared memory 12A of FIG. 6 with use of a predetermined function, the trajectory calculation program 303 calculates the three-dimensional coordinates P(x, y, z) and the three-dimensional coordinates Q(x, y, 0) and acquires the trajectory data 251 and 252. Thus, the trajectory data includes information that shows movements of the robot 300 and the stage 400 estimated by emulation in the three-dimensional virtual space. According to the calculated trajectory data 251 and the image data 253 of the robot 300, the drawing data generation part 19 generates the drawing data 301 for drawing the movement of the robot 300 stereoscopically in the three-dimensional virtual space and outputs it to the display control part 15.

Likewise, by performing calculation on the trajectory data 252 with use of a predetermined function, the trajectory calculation program 303 calculates the chronological three-dimensional coordinates Q(x, y, 0) and stores them as the trajectory data 252. Thus, the trajectory data 252 is information for stereoscopically drawing the movement of the stage 400 estimated by emulation in the three-dimensional virtual space. The drawing data generation part 19 generates the drawing data 401 for stereoscopically drawing the movement of the stage 400 in the same three-dimensional virtual space as the robot 300 according to the calculated trajectory data 252 and the image data 254 of the stage 400, and outputs it to the display control part 15.

(E-4. Synchronization Processing)

The cycle generation part 18 executes the virtual time generation program 29 that generates the signal ST. The cycle generation part 18 outputs the generated signal ST to each of the other parts. Each part executes processing or program in synchronization with the cycle in which the signal ST is outputted from the cycle generation part 18. As a result, the processing or program of each part of the offline system 20 is executed in the cycle of the signal ST or in synchronization with this cycle. The cycle of the signal ST corresponds to a communication cycle of the field network NW2 of the control system 1 of FIG. 1. The communication cycle of the field network NW2 is changeable, and the cycle of the signal ST can be changed to be synchronized with the communication cycle of the field network NW2 after it is changed. The communication cycle is a cycle synchronized with the "control cycle".

Figure 7:
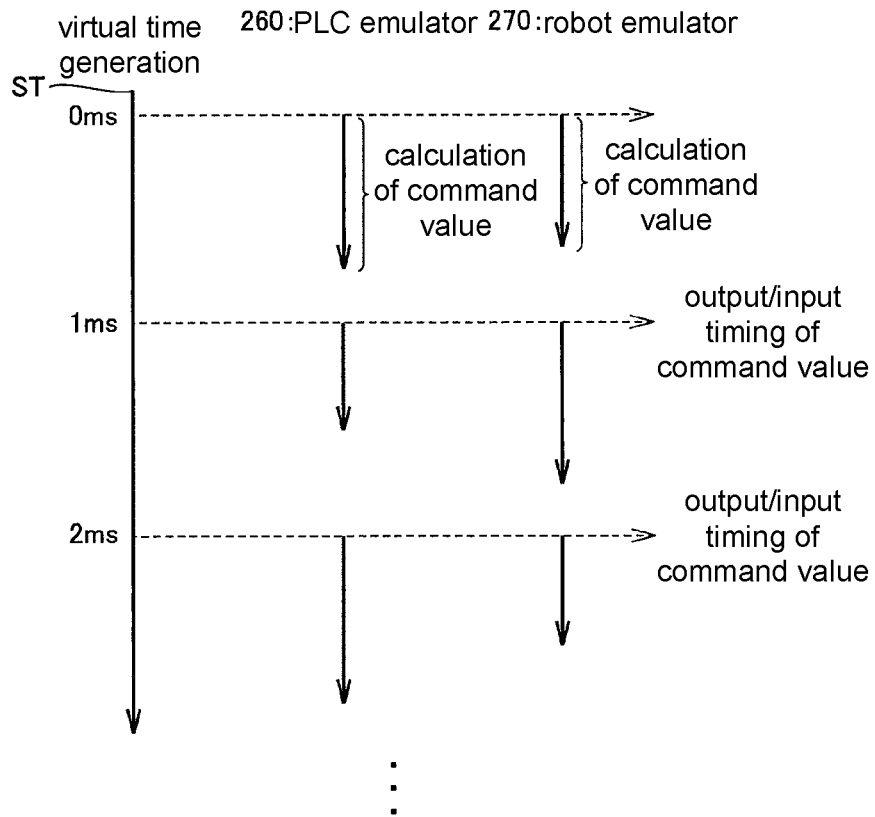
FIG. 7 is a diagram illustrating synchronization of emulators by a virtual time according to the present embodiment.

FIG. 7 is a diagram illustrating synchronization of emulators by the virtual time according to the present embodiment. Referring to FIG. 7, the cycle generation part 18 generates and outputs the signal ST, which has a cycle of 1 msec, for example, from the output of the virtual time of the timer (not shown) of the CPU 2. The program execution part 31 enables the PLC emulator 260 and the robot emulator 270 to start calculation of the command values V1 and V2 according to a common cycle of the signal ST. As a result, the PLC emulator 260 and the robot emulator 270 are executed in a cycle in synchronization with the common cycle shown by the signal ST. When the calculation is started, the PLC emulator 260 calculates the command value V1 based on the input data 144, and the robot emulator 270 calculates the command value V2 based on the output data 145. The program execution part 31 outputs (writes) the calculated command values V1 and V2 to the shared memory 12A in each cycle.

Thus, even if there is a variation in the calculation times required for calculations of the command values V1 and V2 in both the PLC emulator 260 and the robot emulator 270, that is, even if the calculation times for the PLC program 371 and the robot program 381 differ from each other, the PLC emulator 260 and the robot emulator 270 can still respectively match the timings of outputting the calculated command values V1 and V2 to the cycle of the signal ST.

Here, in the present embodiment, since the "control cycle" is synchronized with the cycle of the signal ST, both of the PLC emulator 260 and the robot emulator 270 can calculate new command values V1 and V2 in each control cycle by using the command values V1 and V2 that have been calculated in the immediately preceding control cycle.

The variation between the calculation times for the PLC program 371 and the robot program 381 is based on the types of the program languages of the PLC program 371 and the robot program 381, for example. For example, in the present embodiment, the robot program 381 is described in a sequential execution type language and the PLC program 371 is described in a cyclic execution type language as described above, and the two programs require different times for completing execution of one instruction. According to the present embodiment, such a difference can be nullified by synchronizing the execution cycles of the PLC emulator 260 and the robot emulator 270 with the common control cycle.

(E-5. Program Editing)

In the present embodiment, the offline system 20 may provide an environment for editing the control program. Specifically, the program editing part 34 includes a PLC program editor 32 and a robot program editor 33 for editing the control program. The PLC program editor 32 and the robot program editor 33 respectively correspond to editor programs for editing (changing, adding, deleting, etc.) the robot program 381 and the PLC program 371 according to the user input that the control part 10 receives via the input receiving part 11.

The program editing part 34 reads the robot program 381 and the PLC program 371 from the storage part and displays the read programs on the display 38 via the display control part 15. The user edits the control program displayed on the display 38. For example, the user can debug the control program by editing the control program based on the emulation result.

In the case of debugging based on the emulation result, if high speed emulation as described later is performed, it is possible to reduce the time and effort required for debugging based on the emulation result.

<F. Example of Display Screen>

Figure 8:
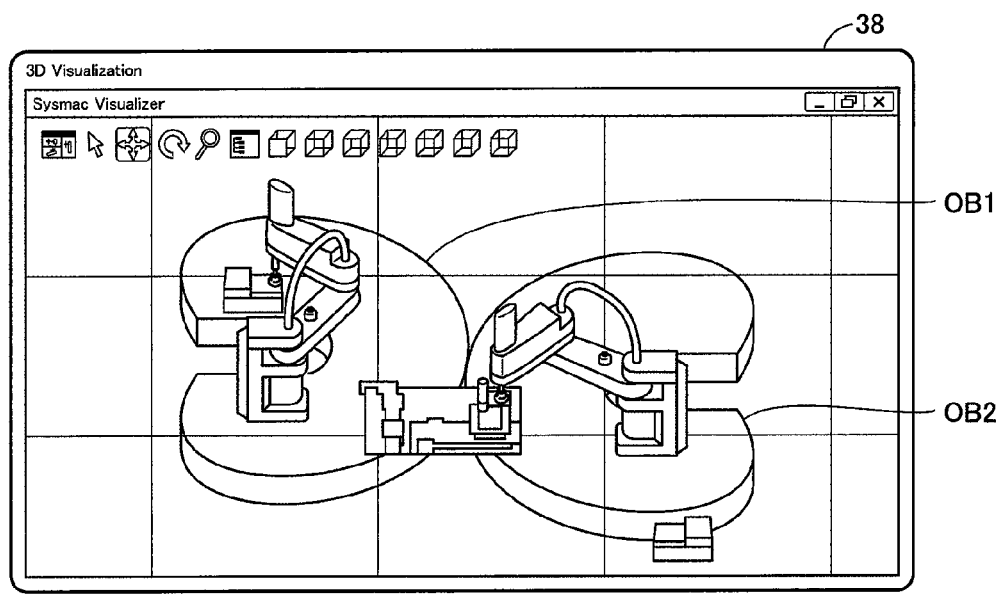
FIG. 8 is a diagram showing an example of the display screen based on drawing data according to the present embodiment.

FIG. 8 is a diagram showing an example of a display screen based on drawing data according to the present embodiment. The display control part 15 displays images OB1 and OB2 of the drawing data 301 and 401 on the display 38. The images OB1 and OB2 show the movements of the robot 300 and the stage 400 in the three-dimensional virtual space. The movement of the robot 300 includes, for example, a movement of gripping a workpiece on the stage 400 and conveying and disposing the workpiece to a predetermined position. Such a series of movements of gripping, conveying, and disposing performed by the robot 300 is also called "pick & place operation". In the present embodiment, by using the drawing data 301 and 401, the movement of "pick & place operation" and the movement of the stage 400 synchronized with the movement of "pick & place operation" can be drawn on the same screen.

Figure 9:
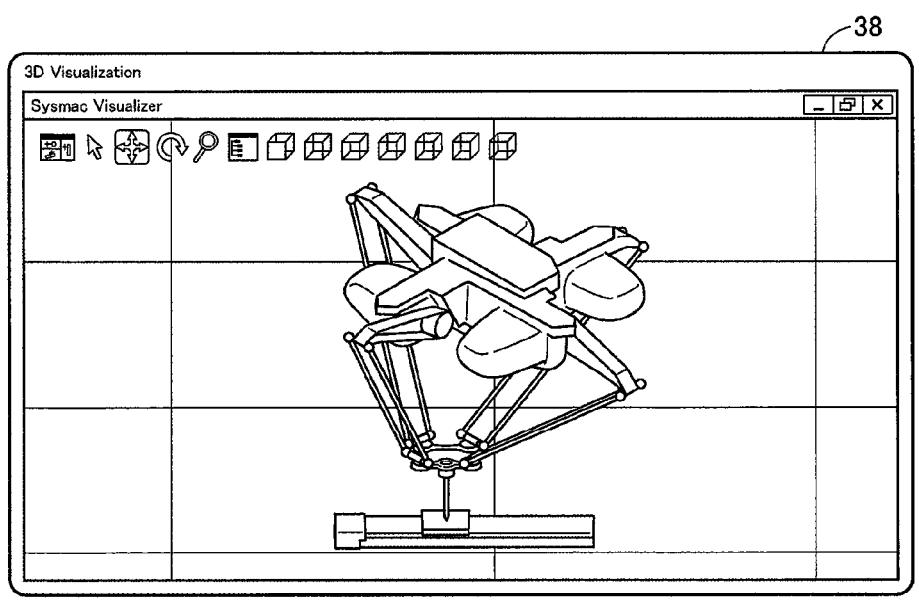
FIG. 9 is a diagram showing another example of the display screen based on drawing data according to the present embodiment.

FIG. 9 is a diagram showing another example of the display screen based on drawing data according to the present embodiment. The PLC emulator 260 and the robot emulator 270 of the present embodiment can also be applied to a robot that performs a movement different from the "pick & place operation". For example, FIG. 9 shows a slider and a robot that moves synchronously with the linear movement of the slider.

<G. Overall Processing of Offline System 20>

Figure 10:
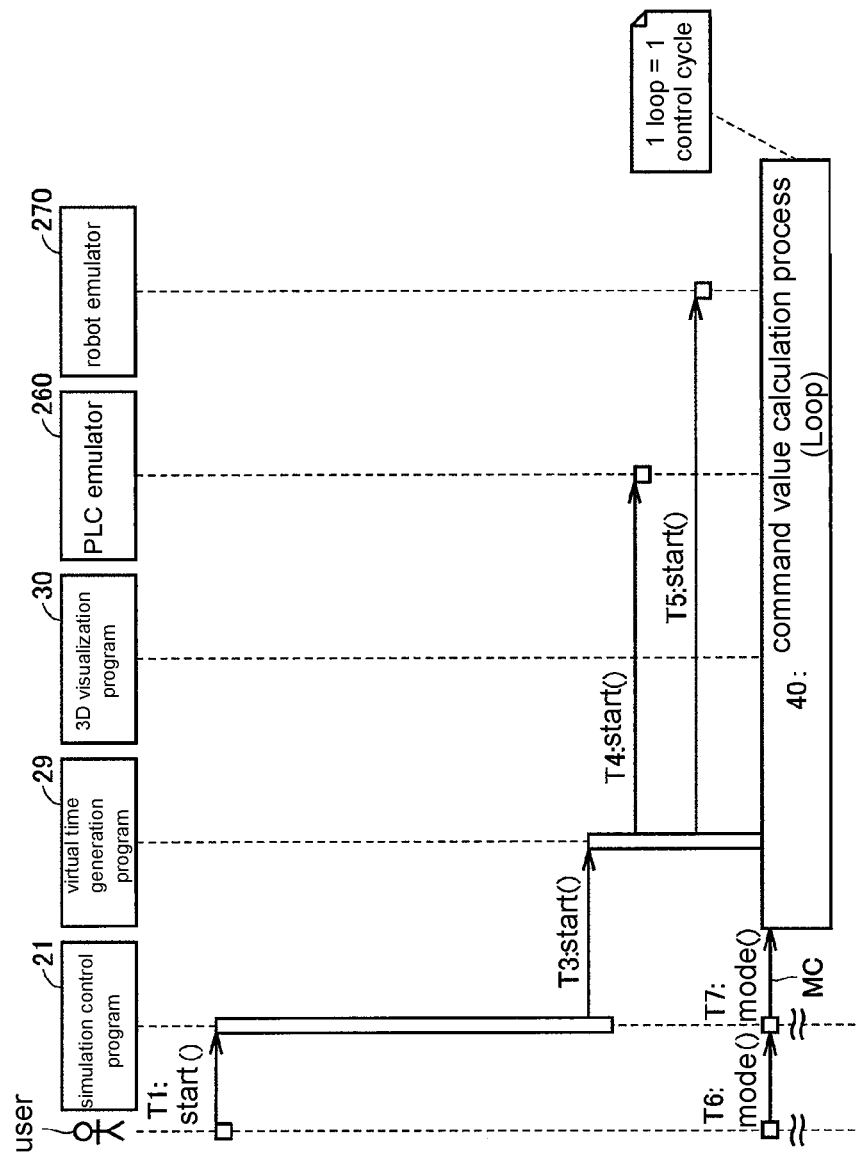
FIG. 10 is a diagram illustrating a process of the offline system 20 performed by the information processing apparatus 100 according to the present embodiment.
Figure 11:
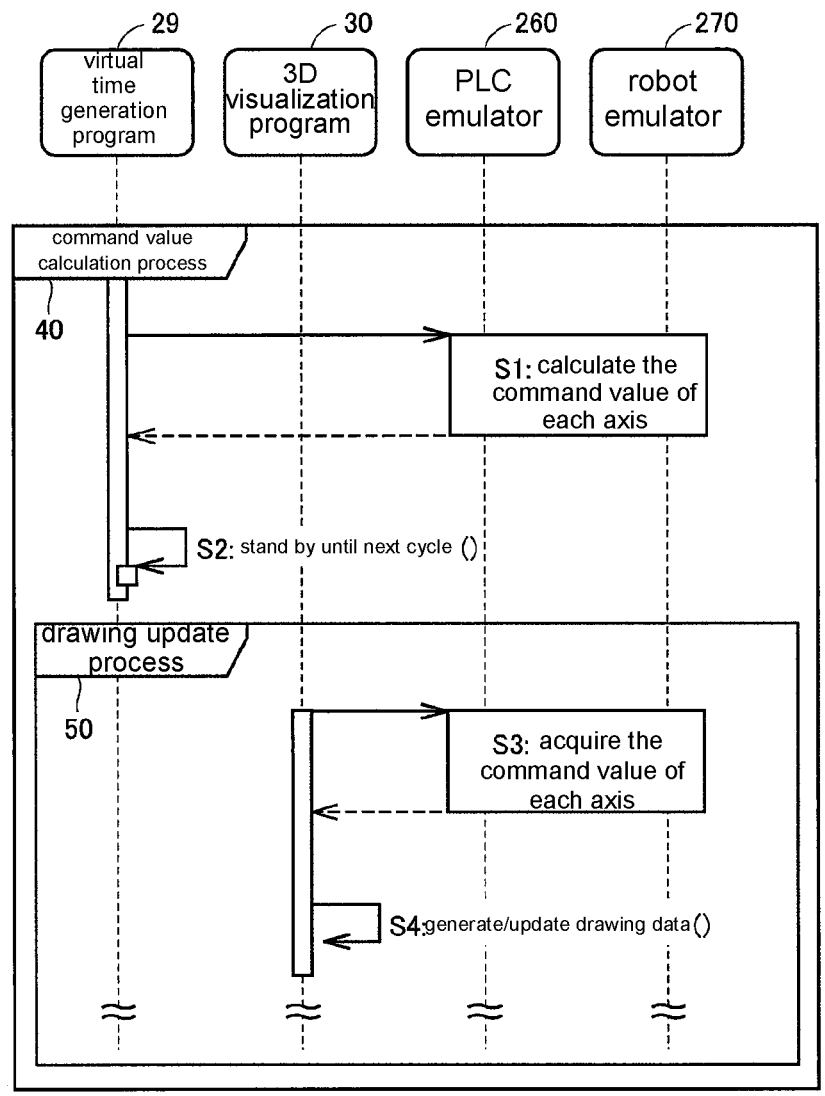
FIG. 11 is a diagram illustrating a process of the offline system 20 performed by the information processing apparatus 100 according to the present embodiment.

FIG. 10 and FIG. 11 are diagrams illustrating processing of the offline system 20 performed by the information processing apparatus 100 according to the present embodiment. In FIG. 10 and FIG. 11, the processing of the offline system 20 is shown in association with a timing chart which shows an input/output relationship between the signals of the respective parts.

Referring to FIG. 10, the simulation control program 21 of the control part 10 starts when a start command is received from the user via the input receiving part 11 (step T1).

The simulation control program 21 of the control part 10 outputs the start command to the cycle generation part 18 (step T3). The cycle generation part 18 starts the virtual time generation program 29 according to the start command. When started, the virtual time generation program 29 starts to output the signal ST and outputs the start command to the PLC emulator 260 and the robot emulator 270 (steps T4 and T5).

The program execution part 31 starts the PLC emulator 260 and the robot emulator 270 according to the start command. Thus, a command value calculation process 40 is executed for calculating the command values V1 and V2. The command value calculation process 40 is executed repeatedly (loop) in every control cycle that uses the virtual time indicated by the signal ST as a scale.

When the command value calculation process 40 is executed, the user performs an operation of specifying an operation mode (step T6). Specification of the operation mode will be described later with reference to FIG. 22A and FIG. 22B. The control part 10 outputs a mode command MC, which indicates the specified operation mode, to the program execution part 31 according to the user's operation content received via the input receiving part 11 (step T7). The program execution part 31 executes the command value calculation process 40 according to the operation mode indicated by the mode command MC.

Referring to FIG. 11, in the command value calculation process 40, first, the simulation control program 21 of the control part 10 determines whether the emulator of the program execution part 31 has stopped temporarily. The control part 10 skips the subsequent processing if it is determined that the execution of the emulator of the program execution part 31 has stopped. As a result, the command value calculation process 40 ends.

On the other hand, if the simulation control program 21 of the control part 10 determines that the execution of the emulator performed by the program execution part 31 is not paused, that is, the execution is in progress, first, the cycle generation part 18 outputs a calculation command to the program execution part 31 by the virtual time generation program 29. The PLC emulator 260 and the robot emulator 270 of the program execution part 31 calculate the command values V1 and V2 of the respective axes according to the calculation command and store them in the shared memory 12A as the input data 144 (step S1). When the calculation performed by the program execution part 31 is completed, the virtual time generation program 29 of the cycle generation part 18 stands by until the next control cycle (step S2).

In a drawing update process 50, the drawing data generation part 19 determines whether it is a drawing update timing by the 3D visualization program 30. The drawing data generation part 19 skips the drawing update process 50 if it determines that it is not the drawing update timing. As a result, the drawing update process 50 ends.

Here, in the present embodiment, the drawing update process 50 is executed in each drawing cycle corresponding to a cycle that is M (M≥2) times the control cycle. Therefore, as compared with the case where the drawing update process 50 is executed in each control cycle, the processing load related to drawing in the information processing apparatus 100 can be reduced.

When the drawing data generation part 19 determines that it is the drawing update timing, that is, when the drawing data generation part 19 determines based on the signal ST that the drawing cycle has elapsed since the previous drawing time, the command values V1 and V2 of the respective axes calculated by the PLC emulator 260 and the robot emulator 270 are acquired (step S3). Specifically, the drawing data generation part 19 searches the shared memory 12A and acquires the command values V1 and V2 from the shared memory 12A by the 3D visualization program 30. The drawing data generation part 19 calculates the trajectory data 251 and 252 based on the acquired command values V1 and V2 and generates the drawing data 301 and 401 from the calculated trajectory data 251 and 252 and the image data 253 and 254 by the 3D visualization program 30. The drawing data generation part 19 outputs the drawing data 301 and 401 to the display control part 15 so as to update the image of the display 38 (step S4).

In FIG. 10 and FIG. 11, in each drawing cycle, the movements of the robot 300 and the stage 400 represented by the drawing data 301 and 401, which uses the command values V1 and V2 of the respective axes calculated in the drawing cycle, are drawn on the screen of the display 38. Thus, from the screen of the display 38, the user can visually recognize the change amounts of the movements of the robot 300 and the stage 400 since the immediately preceding drawing cycle, that is, the movement amount of the robot 300 or the stage 400, in each drawing cycle.

<H. Various Calculation Commands>

In the present embodiment, the calculation command 280 can be classified into a plurality of types of commands according to the mode command CM. The calculation command 280 may be classified into, for example, a ×1 calculation command which sets the movement amount of the robot 300 or the stage 400 per control cycle equal to a predetermined unit movement amount, and variable calculation commands which set the movement amount per control cycle different from the unit movement amount. For example, the variable calculation commands can be classified into a ×N (where N>1.0) calculation command and a ×1/N (where N>1.0) calculation command.

The ×N calculation command instructs to calculate the command values V1 and V2, such that the movement amount per control cycle becomes (N×unit movement amount), for example. In the case of the ×N calculation command, the PLC emulator 260 and the robot emulator 270 of the program execution part 31 calculate the command values V1 and V2, for setting the movement amount to (N×unit movement amount), by performing calculation one time. Thus, the command values V1 and V2 for setting the movement amount obtained by performing calculation N times with use of the calculation command can be obtained by performing calculation one time with the ×N calculation command. In other words, (N−1) times of calculation can be omitted. Therefore, by reducing the number of times of calculation, the processing load on the information processing apparatus 100 related to calculation of the command values V1 and V2 can be reduced. Additionally, the movement of the robot 300 and the movement of the stage 400 can be drawn on the display 38 at a high speed, so that it is possible to achieve the so-called movement fast forwarding.

The ×1/N calculation command instructs to calculate the command values V1 and V2, such that the movement amount per control cycle becomes (1/N×unit movement amount), for example. In the case of the ×1/N calculation command, the PLC emulator 260 and the robot emulator 270 of the program execution part 31 calculate the command values V1 and V2, for setting the movement amount to (1/N×unit movement amount), by performing calculation one time.

For example, the ×1/N calculation command may include a combination of the ×1 calculation command and a sleep command, wherein the ×1 calculation command instructs to calculate the command values V1 and V2 for setting the movement amount to the unit movement amount in the first control cycle of two consecutive control cycles, and the sleep command instructs to stop calculating the command values V1 and V2 in the following second control cycle. As a result, the PLC emulator 260 and the robot emulator 270 of the program execution part 31 calculate the command values V1 and V2 by performing calculation in only one of the N control cycles. Since the calculation can be stopped by the sleep command, the processing load on the information processing apparatus 100 related to the calculation of the command values V1 and V2 can be reduced. In comparison with the ×1 calculation command, the movements of the robot 300 and the stage 400 can be drawn at a speed that is 1/N times slower in the drawing cycle, so that the user can confirm detailed movement of the robot 300 or the stage 400.

<I. Increase of Emulation Speed>

High speed emulation of the ×N calculation command will be described with reference to FIG. 12A to FIG. 12D and FIG. 13.

(I-1. High Speed Emulation and Drawing)

FIG. 12A to FIG. 12D are diagrams illustrating a change in speed of high speed emulation in association with a trajectory to be drawn according to the present embodiment. For illustration, the control cycle is set to 1 msec and the drawing cycle is set to 4 msec in FIG. 12A to FIG. 12D. However, the control cycle is not limited to 1 msec and the drawing cycle is not limited to 4 msec.

Figure 12B:
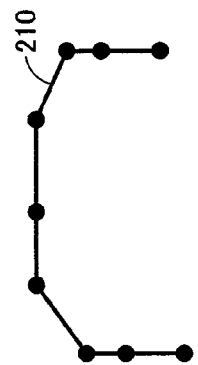
FIG. 12A to FIG. 12D are diagrams illustrating a change in speed of high speed emulation in association with a trajectory to be drawn according to the present embodiment.
Figure 12A:
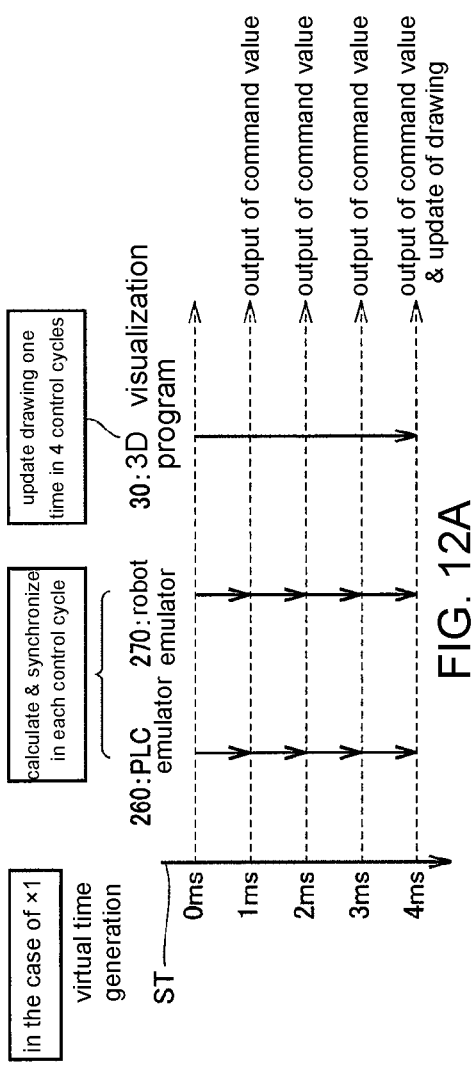

In FIG. 12A to FIG. 12D, the calculation command 280 is outputted in each control cycle, for example. In FIG. 12A, in each control cycle, the calculation command part 36 of the cycle generation part 18 outputs the ×1 calculation command, and the PLC emulator 260 and the robot emulator 270 calculate the command values V1 and V2 in each control cycle according to the ×1 calculation command. In each drawing cycle, the 3D visualization program 30 generates the drawing data 301 and 401 from the command values V1 and V2 calculated in the drawing cycle, and the movements of the robot 300 and the stage 400 are drawn on the display 38. In this case, the trajectory 210 of the movement of the robot 300 can be drawn as shown in FIG. 12B, for example.

Figure 12D:
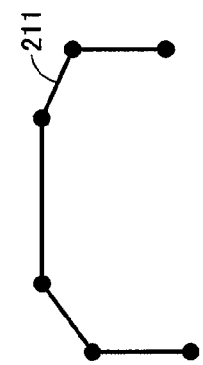
Figure 12C:
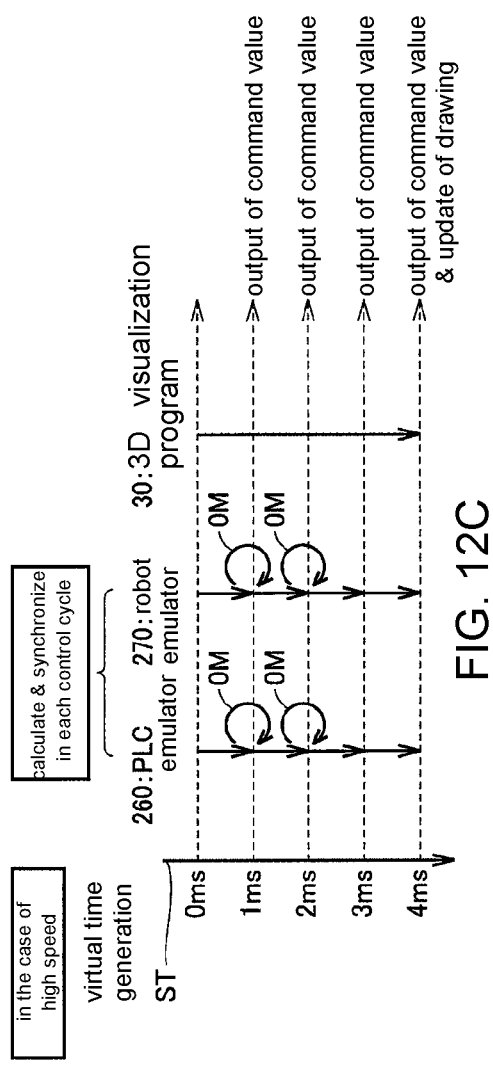

On the other hand, FIG. 12C shows a case where the calculation command part 36 of the cycle generation part 18 outputs the ×N calculation command in each control cycle. For example, in the case of N=2, the PLC emulator 260 and the robot emulator 270 calculate the command values V1 and V2 for obtaining N times the unit movement amount while performing omission OM of one time of calculation in each control cycle according to the ×N calculation command. In each drawing cycle, the 3D visualization program 30 generates the drawing data 301 and 401 from the command values V1 and V2 calculated in the drawing cycle, and the movements of the robot 300 and the stage 400 are drawn on the display 38. In this case, the trajectory 211 of the movement of the robot 300 can be drawn as shown in FIG. 12D, for example.

As compared with the trajectory 210 in FIG. 12B drawn from the command values calculated by the ×1 calculation command, the trajectory 211 in FIG. 12D drawn from the command values calculated by the ×N calculation command is drawn roughly but makes it possible to perform the above-mentioned high speed emulation.

(I-2. Processing of High Speed Emulation)

Figure 13:
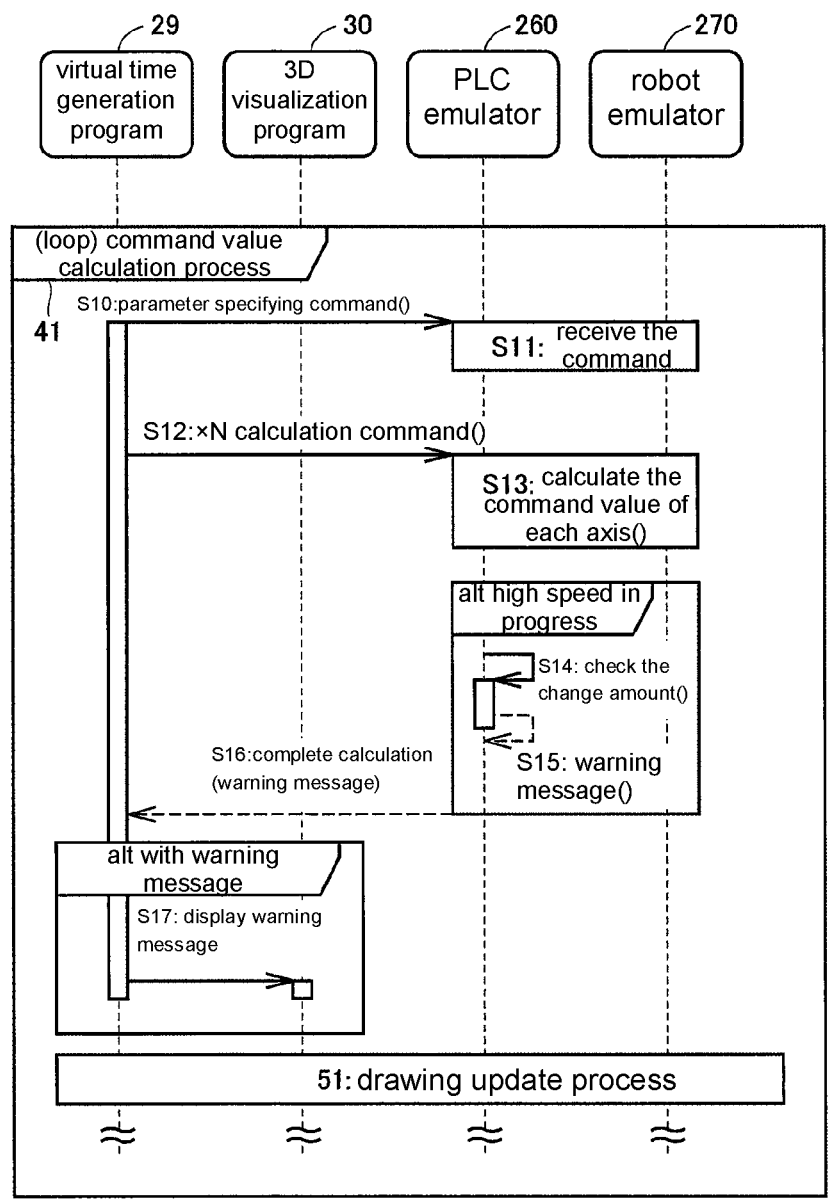
FIG. 13 is a diagram illustrating an example of the command value calculation process 41 for high speed emulation according to the present embodiment.

FIG. 13 is a diagram illustrating an example of a command value calculation process 41 for high speed emulation according to the present embodiment. The command value calculation process 41 of FIG. 13 is a modification example of the command value calculation process 40 of FIG. 11.

Referring to FIG. 13, in the command value calculation process 41, the cycle generation part 18 outputs a parameter specifying command for specifying speed, acceleration, and jerk, for example, to the program execution part 31 through the virtual time generation program 29 as the parameter for setting the movement amounts related to the robot 300 and the stage 400 to N times the unit movement amount (step S10), and the PLC emulator 260 and the robot emulator 270 of the program execution part 31 receive the command (step S11).

The cycle generation part 18 outputs the ×N calculation command to the program execution part 31 through the virtual time generation program 29 (step S12). The PLC emulator 260 and the robot emulator 270 of the program execution part 31 calculate the command values V1 and V2 of the respective axes corresponding to the parameter specified in step S11 according to the ×N calculation command (step S13) and store them in the shared memory 12A as the input data 144.

In the processing of FIG. 13, when determining that high speed emulation is being performed, the program execution part 31 may perform a warning process (step S14 to step S16) which will be described later.

In the drawing update process 51, when the drawing data generation part 19 determines that it is the drawing update timing, the drawing data generation part 19 calculates the trajectory data 251 and 252 from the command values V1 and V2 of the shared memory 12A through the 3D visualization program 30, and uses the calculated trajectory data 251 and 252 to generate the drawing data 301 and 401 and output it to the display control part 15. At this time, if a display command of a warning message of warning processing has been received (step S17), the warning message is outputted to the display control part 15.

(I-3. Warning Processing of High Speed Emulation)

In the warning processing (step S14 to step S16) of FIG. 13, the PLC emulator 260 and the robot emulator 270 of the program execution part 31 respectively detect a change amount DV1 and a change amount DV2, wherein the change amount DV1 is the difference between the command values V1 of the control cycles and the change amount DV2 is the difference between the command values V2 of the control cycles. The change amounts DV1 and DV2 are checked (determined), and a warning message is sent to the cycle generation part 18 according to the check result.

Specifically, the PLC emulator 260 calculates the change amount DV1, which is the difference between the command value V1 calculated by the ×N calculation command of the current control cycle and the command value V1 calculated by the ×N calculation command of the immediately preceding control cycle, and determines whether a predetermined condition indicated by (change amount DV1>change amount threshold value), for example, is satisfied (step S14). When determining that this condition is satisfied, the PLC emulator 260 generates the warning message (step S15).

Likewise, the robot emulator 270 calculates the change amount DV2, which is the difference between the command value V2 calculated by the ×N calculation command of the current control cycle and the command value V2 calculated by the ×N calculation command of the immediately preceding control cycle, and determines whether a predetermined condition of (change amount DV2>change amount threshold value) is satisfied (step S14). When determining that this condition is satisfied, the robot emulator 270 generates the warning message (step S15). The change amount threshold value is, for example, a preset value.

The program execution part 31 outputs a calculation completion notification to the cycle generation part 18 when the calculation according to the ×N calculation command is completed. In this case, when the warning message is outputted by the warning processing described above, the program execution part 31 sends the calculation completion notification with the warning message to the cycle generation part 18 (step S16).

When determining that the warning message is added to the calculation completion notification from the program execution part 31, the virtual time generation program 29 of the cycle generation part 18 outputs a display command of the warning message to the 3D visualization program 30 of the drawing data generation part 19 (step S17). In the drawing update process 51, the 3D visualization program 30 generates the drawing data 301 and 401 with the warning message and outputs it to the display control part 15. As a result, drawing representing the movements of the robot 300 and the stage 400 and the warning message are displayed on the display 38.

The background of the present embodiment regarding the warning processing will be described below. In the case of high speed emulation of the present embodiment, the movement amount based on the command values V1 and V2 calculated in each control cycle increases as the value of N of the ×N calculation command increases, and therefore, the drawing of the movements of the robot 300 and the stage 400 on the screen of the display 38 tends to be rough. If the drawing is made roughly, for example, the user may have trouble in accurately grasping the movement of the robot 300 or the stage 400 from the screen of the display 38.

In order to prevent such trouble, in the warning processing of the present embodiment, when it is determined that the above-mentioned condition related to the change amounts DV1 and DV2 is satisfied, the warning message is outputted to suggest to the user that the emulation speed may be too high.

In the present embodiment, the warning processing is executed by the PLC emulator 260 and the robot emulator 270 of the program execution part 31 respectively, rather than the drawing data generation part 19. Therefore, depending on the specification of the CPU 2, for example, the processing of the drawing data generation part 19 may be omitted due to the load, but in the present embodiment, it is still possible to reliably carry out the warning processing in each control cycle.

Although the above condition of the warning processing is based on the change amounts of the command values V1 and V2, it is not limited to the change amounts of the command values. For example, the change amount of a moving distance of the arm of the robot 300 between the control cycles or the change amount of a moving distance of the stage 400 between the control cycles may be detected from the position data of the trajectory data 251 of the three-dimensional coordinate values P and Q calculated by the 3D visualization program 30, and a warning may be outputted when the change amount exceeds a predetermined distance threshold value.

In addition, the warning processing may also be performed by combining the change amounts of the command values V1 and V2 and the change amount of the moving distance.

(I-4. Example of Display of Warning Message)

Figure 14:
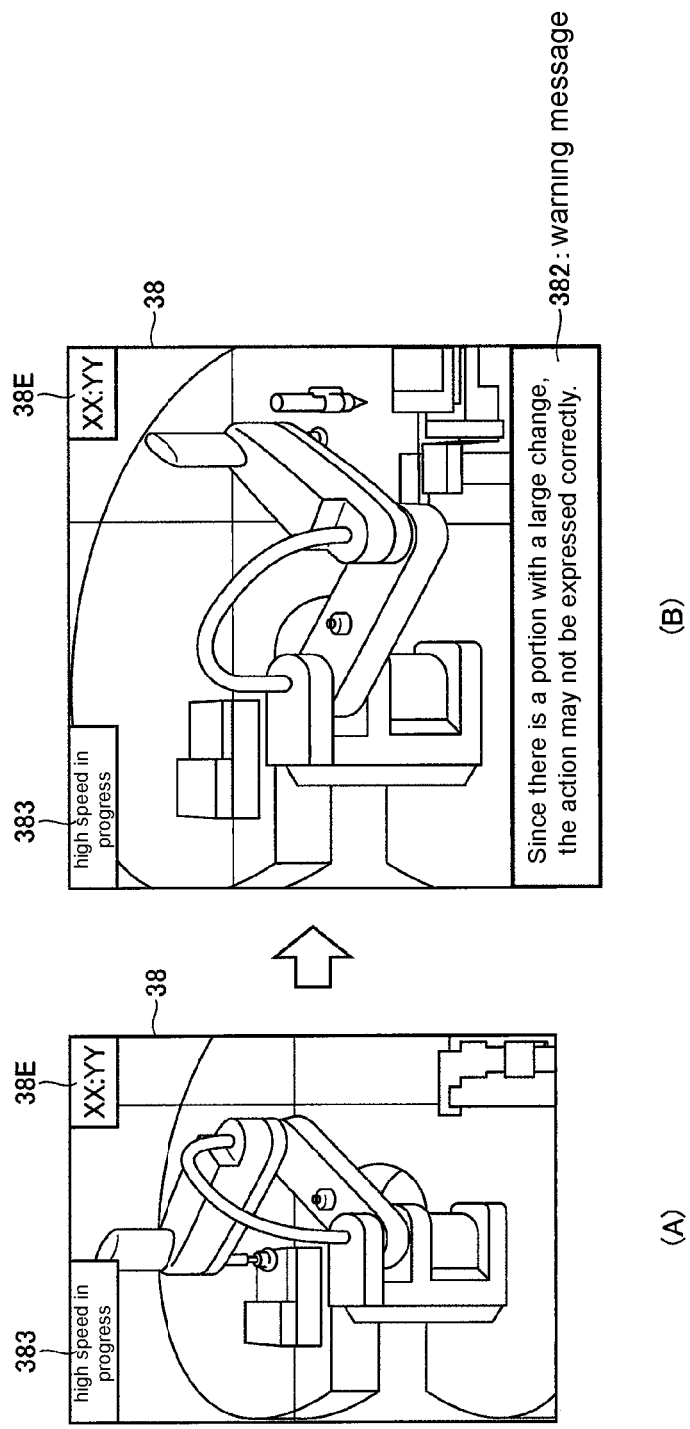
FIG. 14 includes diagrams (A) and (B) showing an example of display of a warning message in high speed emulation according to the present embodiment.

FIG. 14 includes diagrams (A) and (B) showing an example of display of a warning message in high speed emulation according to the present embodiment. Diagram (A) of FIG. 14 is an example of the display screen of high speed emulation and diagram (B) of FIG. 14 shows an example of display of a warning message 382. On the screen of diagram (A) of FIG. 14, a message 383 indicating that high speed emulation is being performed and a time 38E are displayed. The message 383 is, for example, a character string but not limited thereto. It may also be a mark. The time 38E is based on the virtual time indicated by the signal ST, and indicates the elapsed time since the start of emulation, for example. In diagram (B) of FIG. 14, the warning message 382 is shown by a character string, but it is not limited thereto. For example, it may also be a warning mark or a voice warning. It may also be a combination of display and voice.

(I-5. An Example of Specifying Thinned-out Portion)

In the present embodiment, the omission OM of calculation, as shown in FIG. 12C, is performed when high speed emulation is performed. Such omission OM of calculation is equivalent to thinning out a portion of a series of movements of the robot 300 and the stage 400 in the drawing. In the present embodiment, it is possible to specify the thinned-out portion variably.

Figures 15A, 15B:
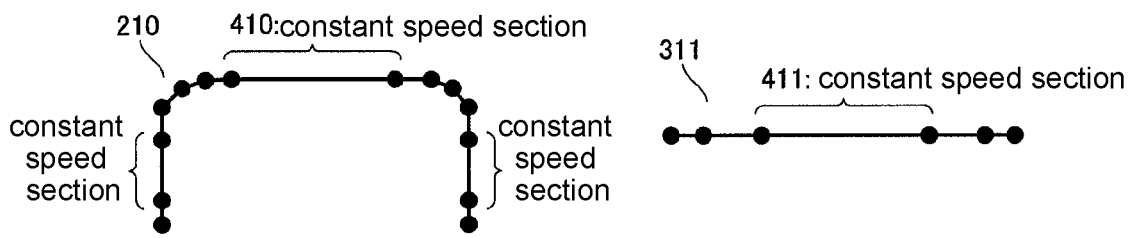
FIG. 15A and FIG. 15B are diagrams illustrating an example of the method of specifying a thinned-out portion according to the present embodiment.

FIG. 15A and FIG. 15B are diagrams illustrating an example of a method of specifying the thinned-out portion according to the present embodiment. FIG. 15A shows an example of the trajectory 210 of movement according to the target position of the robot 300 and FIG. 15B shows an example of the trajectory 311 of movement according to the target position of the stage 400.

The thinned-out portion may correspond to a section of constant speed movement (hereinafter referred to as constant speed section) on the trajectories 210 and 311, for example. In order to detect the constant speed section, in the present embodiment, in the command value calculation process 40 or the command value calculation process 41, the PLC emulator 260 and the robot emulator 270 perform constant speed section detection processing, and output a constant speed section notification to the cycle generation part 18 when a constant speed section is detected. When receiving the constant speed section notification from each of the PLC emulator 260 and the robot emulator 270, the cycle generation part 18 outputs the ×N calculation command to the program execution part 31.

In the constant speed section detection processing, the PLC emulator 260 and the robot emulator 270 respectively detect the change amount DV1 of the command value V1 and the change amount DV2 of the command value V2 between the control cycles. The PLC emulator 260 and the robot emulator 270 respectively output the constant speed section notification when a condition (which is referred to as constant speed condition) is satisfied for a predetermined period of time (which is referred to as constant speed section). The constant speed condition indicates that both the change amount DV1 and the change amount DV2 are equal to or less than a threshold value (for example, substantially zero) from the sections corresponding to a common elapsed time since the start of emulation in the first target trajectory and the second target trajectory.

When receiving the constant speed section notification from both the PLC emulator 260 and the robot emulator 270, the cycle generation part 18 switches the calculation command to the ×N calculation command and outputs the ×N calculation command while receiving the constant speed section notification. Then, when the constant speed section is no longer detected (that is, when the constant speed section notification is not received from at least one of the PLC emulator 260 and the robot emulator 270), the cycle generation part 18 switches the calculation command to the original ×1 calculation command and returns to emulation based on the original ×1 calculation command. As a result, high speed emulation according to the ×N calculation command can be performed only in the constant speed section.

For example, on the trajectory 210 of the robot 300 in FIG. 15A, three constant speed sections are detected, whereas on the trajectory 311 of the stage 400 in FIG. 15B, one constant speed section is detected. In this case, for example, the second constant speed section 410 on the trajectory 210 of the robot 300 and the constant speed section 411 on the trajectory 311 of the stage 400 have a common elapsed time since the start of emulation. As a result, the cycle generation part 18 outputs the ×N calculation command in the time of the common constant speed sections 410 and 411, and high speed emulation for thinning out the movement is performed by the program execution part 31.

(I-6. Another Example of Specifying Thinned-Out Portion)

Figure 16:
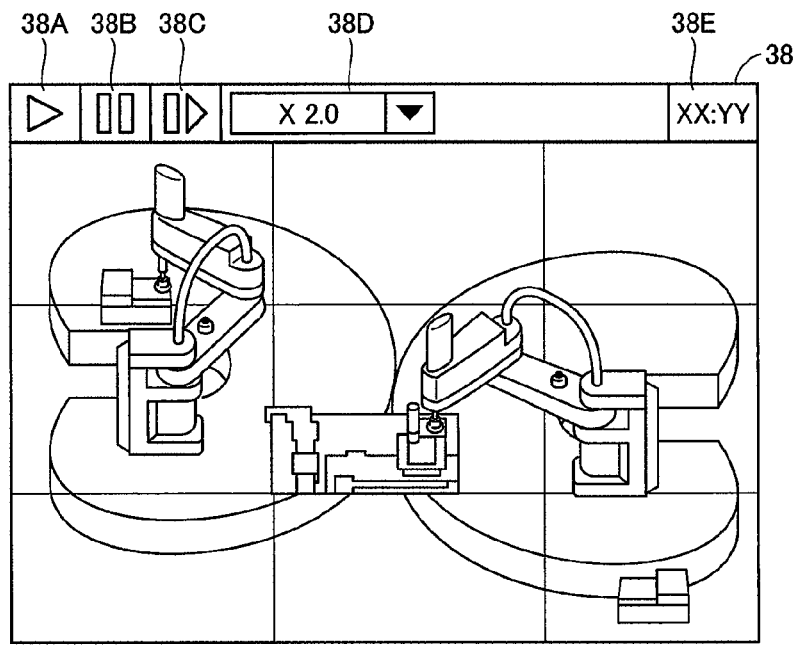
FIG. 16 is a diagram illustrating another example of specifying the thinned-out portion according to the present embodiment.

FIG. 16 is a diagram illustrating another example of specifying the thinned-out portion according to the present embodiment. FIG. 16 shows an example of display of a screen for receiving specification of a thinned-out portion made by the user. The screen of the display 38 in FIG. 16 includes a drawing of the movements of the robot 300 and the stage 400 by emulation, and a dialog box. The dialog box includes icons 38A, 38B, 38C, and 38D to be operated to respectively instruct "start", "pause", "frame feeding", and "speed change" of emulation.

The user operates a pull-down menu of the icon 38D to specify the value of "N" of the ×N calculation command. The input receiving part 11 outputs the operation content received via the icon 38D to the control part 10. The control part 10 outputs the received operation content to the cycle generation part 18. For example, when the user's operation content indicates "value=1.0", the cycle generation part 18 determines to output the ×1 calculation command as the calculation command, and when it indicates "value >1.0", the cycle generation part 18 determines to output the ×N calculation command. When "value <1.0", the cycle generation part 18 determines to output the ×1/N calculation command.

Thus, the user can change the emulation speed by operating the icon 38D. For example, in the case of checking in detail the movement of the robot 300 or the stage 400 when 30 minutes has elapsed since the emulation starts, the user can operate the icon 38D to specify "N" as a value exceeding 1.0 at the start of emulation, so as to advance the movement of the robot 300 or the stage 400 to the state when 30 minutes have elapsed without actually waiting for 30 minutes. Then, when drawing of the state that is 30 minutes later is done, the user can operate the icon 38D to change the value of "N" to 1.0, so as to draw a detailed movement by emulation of the ×1 calculation command after 30 minutes.

Change of the emulation speed through operation of the icon 38D may be applied, for example, for checking whether there will be "interference" between the movement of the arm of the robot 300 and the movement of the stage 400. For example, there are cases where the user may check whether "interference" occurs after 30 minutes from the start of emulation. Nevertheless, the application examples are not limited thereto.

Regarding the "interference", for example, in the "pick & place operation" of the robot 300, "interference" is likely to occur when the arm of the robot 300 grips (picks) the workpiece on the stage 400 and when the gripped workpiece is disposed (placed) on the stage 400. Therefore, in such a scene, the user may perform the emulation at a high speed before the pick operation or before the place operation, and may reduce the emulation speed at the time of the pick operation or the place operation.

Detection of the pick or place operation uses pattern matching, for example. Patterns of the coordinates P(x, y, z) and the coordinates Q(x, y, 0) of the robot 300 and the stage 400 at the time of picking or placing are stored in advance. Then, when picking or placing is detected during the emulation, the coordinates P and Q are compared with the registered patterns, and whether they correspond to the pick or place operation is detected based on the comparison result.

Moreover, the section for which high speed emulation should be performed may be a section that the relative positional relationship between the robot 300 and the stage 400 in the three-dimensional virtual space satisfies a predetermined condition, for example. Specifically, based on the coordinates P(x, y, z) of the robot 300 indicated by the trajectory data 251 and the coordinates Q(x, y, 0) of the stage 400 indicated by the trajectory data 252, the cycle generation part 18 calculates a relative distance between the two positions. The cycle generation part 18 determines that a section where a predetermined condition indicating (calculated distance>distance A) is satisfied is the section for which high speed emulation should be performed. As a result, high speed emulation is performed in the section where the relative positional relationship between the robot 300 and the stage 400 indicates that they are sufficiently separated, that is, the section where it is determined that "interference" is less likely to occur.

In addition, the cycle generation part 18 may output the ×N calculation command in the constant speed section of FIG. 15A or the section where the condition of (calculated distance>distance A) is satisfied or both.

(I-7. Processing of High Speed Emulation in Constant Speed Section)

Figure 17:
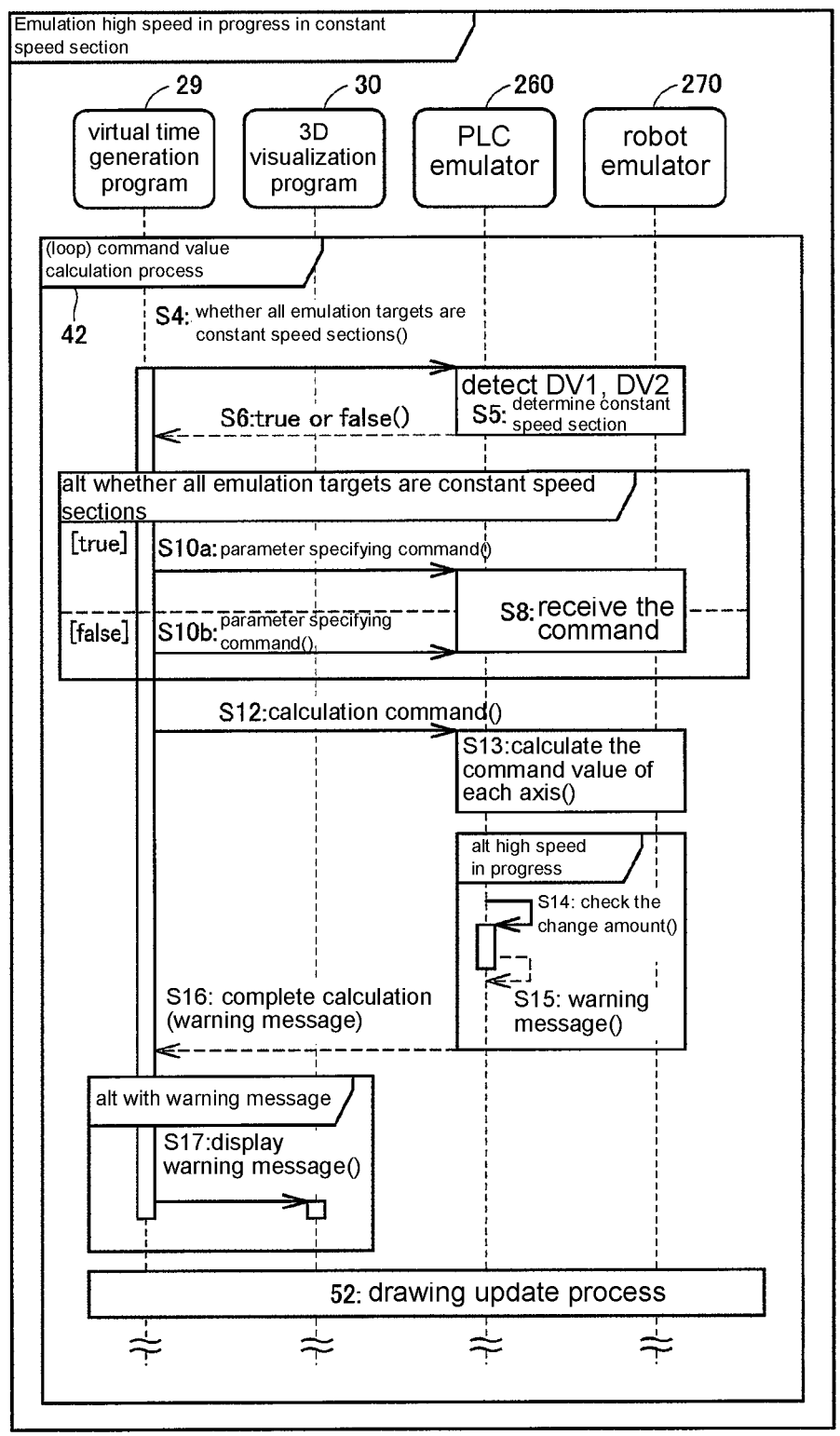
FIG. 17 is a diagram illustrating the command value calculation process 42 for emulation according to the present embodiment.

FIG. 17 is a diagram illustrating a command value calculation process 42 for emulation according to the present embodiment. The command value calculation process 42 of FIG. 18A to FIG. 18D is a modification example of the command value calculation process 41 of FIG. 13 and includes a process of detecting the constant speed section.

Referring to FIG. 17, in the command value calculation process 42, the cycle generation part 18 inquires whether the constant speed section is detected by the PLC emulator 260 and the robot emulator 270 of the program execution part 31 when emulation is being performed (step S4).

The PLC emulator 260 and the robot emulator 270 respectively perform constant speed section detection processing (step S5), and output the result of detecting the constant speed section (true or false) (step S6). When the constant speed section is detected, "true" (that is, the constant speed section notification) is outputted to the cycle generation part 18 (step S6).

When the constant speed section notification is received from both the PLC emulator 260 and the robot emulator 270, as in step S10 of FIG. 13, the cycle generation part 18 outputs the parameter specifying command that specifies a parameter for setting the movement amount to N times the unit movement amount to the program execution part 31 through the virtual time generation program 29 (step S10a), and the PLC emulator 260 and the robot emulator 270 of the program execution part 31 receive the command (step S8).

On the other hand, when the constant speed section notification is not received from both the PLC emulator 260 and the robot emulator 270, the cycle generation part 18 outputs the parameter specifying command, which specifies speed, acceleration, and jerk, as a parameter for setting the movement amount equal to the unit movement amount to the program execution part 31 through the virtual time generation program 29 (step S10b), and the PLC emulator 260 and the robot emulator 270 of the program execution part 31 receive the command (step S8).

Thereafter, the cycle generation part 18 outputs a calculation command (one of the ×N calculation command and the ×1 calculation command) according to the constant speed section notification to the program execution part 31 (step S12). As a result, when both the PLC emulator 260 and the robot emulator 270 detect the constant speed section, the PLC emulator 260 and the robot emulator 270 calculate the command values V1 and V2 according to the ×N calculation command (step S13). When neither of the PLC emulator 260 and the robot emulator 270 detects the constant speed section, the command values V1 and V2 are calculated according to the ×1 calculation command (step S13).

Like the processing of FIG. 13, the warning processing (step S14 to step S16) and display of the warning message 382 obtained by the warning processing (step S17) may also be performed in the command value calculation process 42 of FIG. 17.

Like the drawing update process 51 of FIG. 13, in the drawing update process 52, drawing is performed on the display 38. Specifically, in the constant speed section, the drawing data 301 and 401 is generated from the command values V1 and V2 that are calculated while high speed emulation is performed, and drawing is performed on the display 38 according to the generated drawing data 301 and 401.

In the processing of FIG. 17, high speed emulation is performed in the constant speed section. However, the processing of FIG. 17 can also be applied in the same manner when the user carries out high speed emulation in the section specified by operating the icon 38D or in the section where the condition of (calculated distance>distance A) is satisfied.

<J. Reduce Emulation Speed>

Figure 18B:
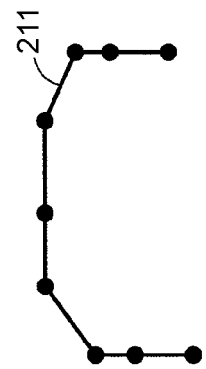
FIG. 18A to FIG. 18D are diagrams illustrating a change in speed of low speed emulation in association with a trajectory to be drawn according to the present embodiment.
Figure 18D:
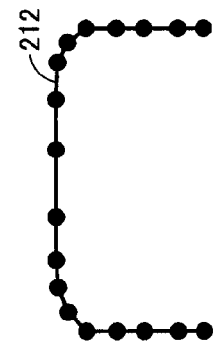
Figure 18A:
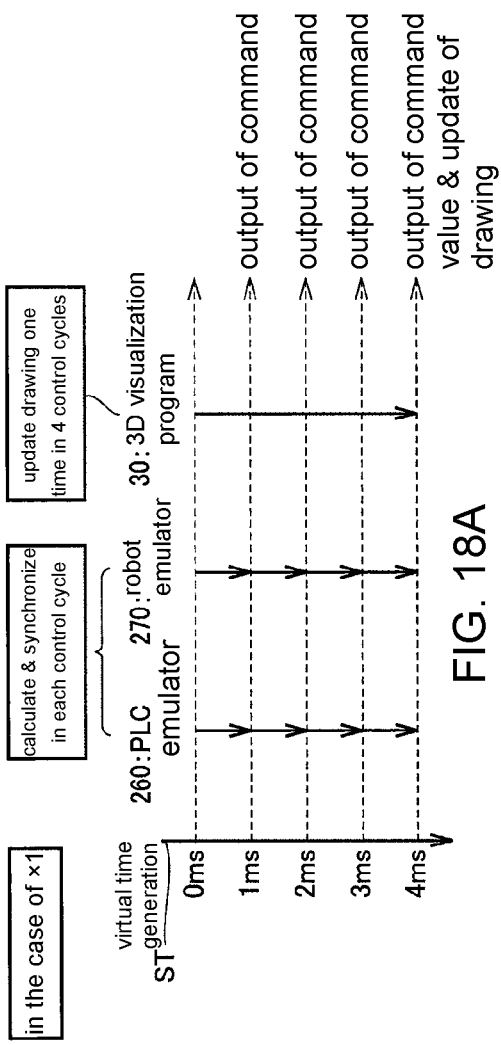

FIG. 18A to FIG. 18D are diagrams illustrating a change in speed of low speed emulation in association with a trajectory to be drawn according to the present embodiment. For illustration, in FIG. 18A to FIG. 18D, the control cycle is set to 1 msec and the drawing cycle is set to 4 msec, like FIG. 12A to FIG. 12D. FIG. 18A and FIG. 18B illustrate emulation based on the ×1 calculation command as shown in FIG. 12A and FIG. 12B.

Figure 18C:
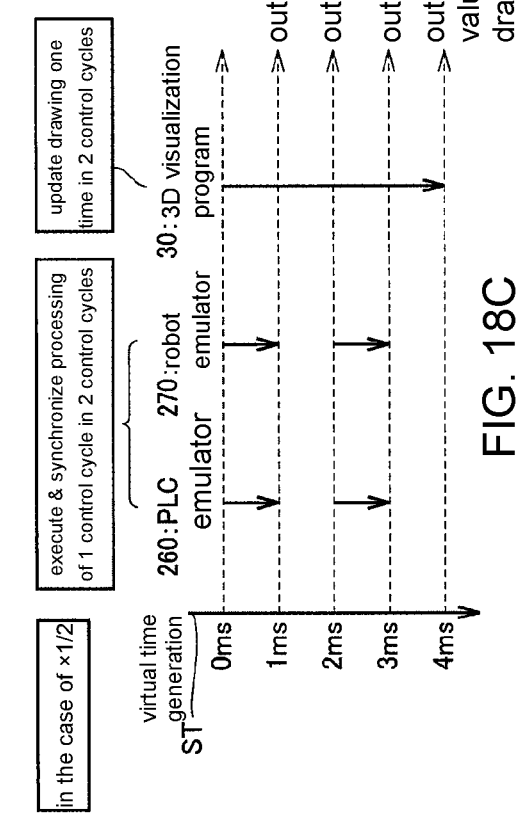

On the other hand, FIG. 18C and FIG. 18D show a case where a ×½ calculation command is outputted, for example. In the case of the ×½ calculation command, the command values V1 and V2 are calculated in 1 control cycle (for example, 1 msec), and in the next 1 control cycle, the PLC emulator 260 and the robot emulator 270 stop calculating the command values V1 and V2.

As a result, in each drawing cycle, the trajectory 212 according to the movement amount based on the command values V1 and V2, which correspond to two control cycles by the ×1 calculation command, is drawn, which achieves low speed drawing that is done slower than the drawing of the trajectory 211 of the ×1 calculation command. Thus, for example, in the case of drawing that shows a curved trajectory, if the ×1 calculation command is used, the drawing is done relatively fast. Therefore, the user visually recognizes the curved trajectory as a substantially linear trajectory. However, if the ×1/N calculation command is used, the curved trajectory is drawn slowly in detail, so that the user can visually recognize the original curved trajectory. A specific example of reducing the emulation speed will be described with reference to FIG. 19 to FIG. 21.

(J-1. Processing of Low Speed Emulation)

Figure 19:
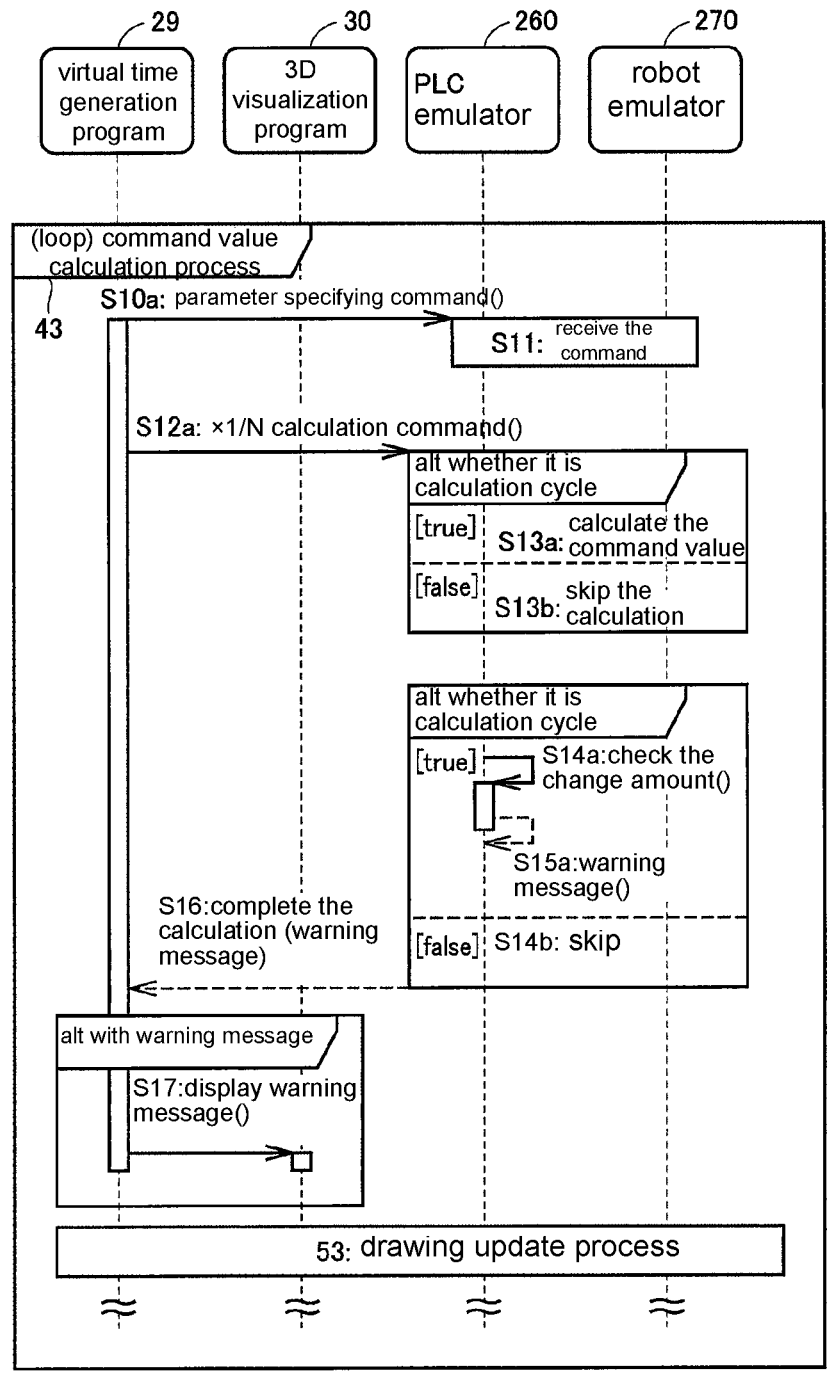
FIG. 19 is a diagram illustrating the command value calculation process 43 for low speed emulation according to the present embodiment.

FIG. 19 is a diagram illustrating a command value calculation process 43 for low speed emulation according to the present embodiment. The command value calculation process 43 of FIG. 19 is a modification example of the command value calculation process 41 of FIG. 13.

Referring to FIG. 19, in the command value calculation process 43, the cycle generation part 18 outputs a parameter specifying command, which specifies speed, acceleration, and jerk, as a parameter for setting the movement amount to 1/N times the unit movement amount to the program execution part 31 through the virtual time generation program 29 (step S10a), and the PLC emulator 260 and the robot emulator 270 of the program execution part 31 receive the command (step S11).

The cycle generation part 18 outputs the ×1/N calculation command to the program execution part 31 (step S12a). The PLC emulator 260 and the robot emulator 270 of the program execution part 31 perform calculation according to the ×1/N calculation command (step S13a and step S13b). Here, N=2.0 for example, but the value of N is not limited to "2.0".

When the ×1/N calculation command is inputted, the program execution part 31 determines that the first control cycle, among two consecutive control cycles CT after the command is inputted, is a calculation cycle, and the PLC emulator 260 and the robot emulator 270 calculate the command values V1 and V2 in the same manner as the ×1 calculation command (step S13a). The program execution part 31 determines that the following second control cycle CT stops calculation of the command values by the sleep command, and the PLC emulator 260 and the robot emulator 270 stop (skip) the calculation (step S13b). Therefore, in the program execution part 31, the command values V1 and V2 are calculated only in the first control cycle of two control cycles.

Also, in the processing of FIG. 19, the program execution part 31 performs the same warning processing (step S14a, step S15a, and step S16) as in FIG. 13 in the calculation cycle, and skips (does not perform) the warning processing when it is not the calculation cycle (step S14b).

In the drawing update process 53, like the drawing update process 51 in FIG. 13, the drawing data 301 and 401 are generated by using the trajectory data 251 and 252 calculated from the command values V1 and V2 of the shared memory 12A, and outputted to the display control part 15. At this time, if a display command of the warning message obtained by the warning processing is received (step S17), the warning message is outputted to the display control part 15 together with the drawing data 301 and 401.

(J-2. Method of Specifying the Section for Performing Low Speed Emulation)

Figure 20A:
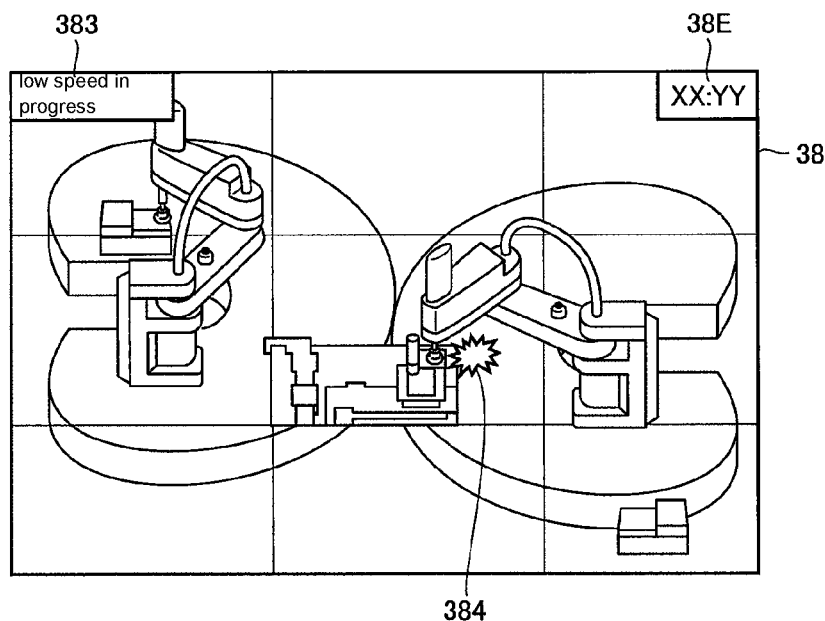
FIG. 20A to FIG. 20C are diagrams illustrating an example of the method of specifying a portion for performing low speed emulation according to the present embodiment.
Figure 20B:
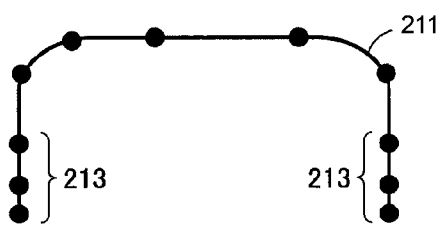
Figure 20C:
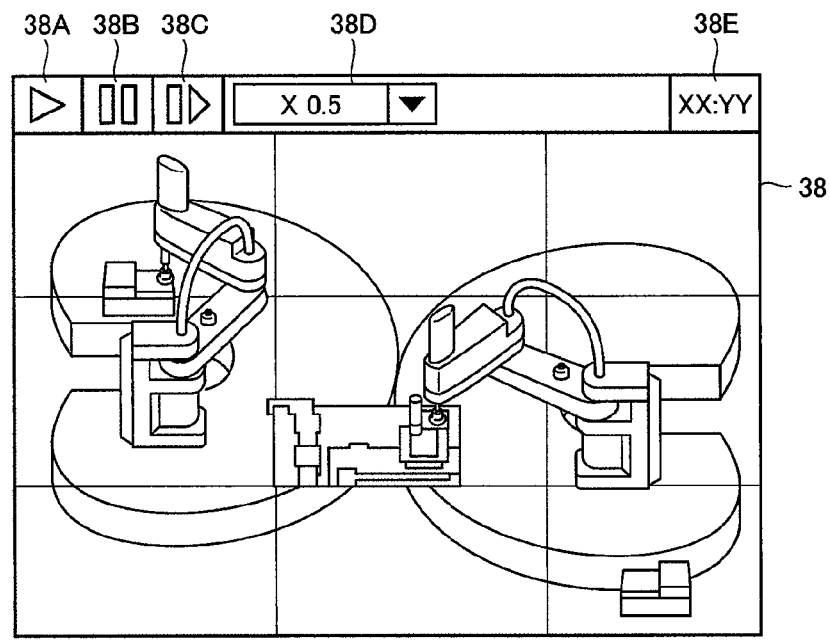

In the present embodiment, it is possible to variably specify a portion for performing low speed emulation on the trajectories according to the target values of the robot 300 and the stage 400. FIG. 20A to FIG. 20C are diagrams illustrating an example of the method of specifying a portion for performing low speed emulation according to the present embodiment. Referring to FIG. 20A, a message 383 indicating that low speed emulation is being performed is displayed on the screen of the display 38 which is performing low speed emulation.

Like the section for which high speed emulation should be performed, the section for performing low speed emulation may be a section where the relative positional relationship between the robot 300 and the stage 400 in the three-dimensional virtual space satisfies a predetermined condition, for example. Specifically, based on the coordinates P(x, y, z) of the robot 300 indicated by the trajectory data 251 and the coordinates Q(x, y, 0) of the stage 400 indicated by the trajectory data 252, the cycle generation part 18 calculates the distance between them, and determines that it is the section for performing low speed emulation if the condition of (calculated distance<distance B) is satisfied. Here, the distance B is, for example, a distance that may result in "interference" and is, for example, a preset value.

If the condition of (calculated distance<distance B) is satisfied, the drawing data generation part 19 may display a polygon 384 of FIG. 20A on the display 38 via the display control part 15 to notify the user of the possibility of "interference".

Moreover, in the cycle generation part 18, the condition of the relative positional relationship between the robot 300 and the stage 400 in the three-dimensional virtual space may, for example, include a condition of the relative positional relationship in the three-dimensional virtual space in the actions before and after pick or place, which are likely to cause "interference", in the "pick & place operation". For example, in FIG. 20B, the portion 213 on the trajectory 211 of the robot 300 is an example of the portion of the "pick & place operation", and low speed emulation is performed in the portion 213.

In addition, the user may specify the portion for performing low speed emulation. The screen of the display 38 in FIG. 20C includes a drawing of the movements of the robot 300 and the stage 400 by emulation and a dialog box. The dialog box includes icons 38A, 38B, 38C, and 38D like FIG. 16.

The user specifies the value of "1/N" of the ×1/N calculation command by operating the pull-down menu of the icon 38D. In FIG. 20C, it is specified that 1/N=0.5, for example. If a value less than 1 is set to the icon 38D, the cycle generation part 18 may determine to start low speed emulation thereafter.

Since low speed emulation is performed by specifying the portion where "interference" is likely to occur, such as the actions before and after pick or place in the "pick & place operation", the user can easily grasp whether "interference" will occur, the degree of the "interference", or the movement before and after the interference from the drawn movement.

<K. Combination of High Speed Emulation and Low Speed Emulation>

In the present embodiment, emulation can be performed by combining high speed emulation and low speed emulation. More specifically, the program execution part 31 can perform emulation while switching between high speed emulation and low speed emulation.

Figure 21:
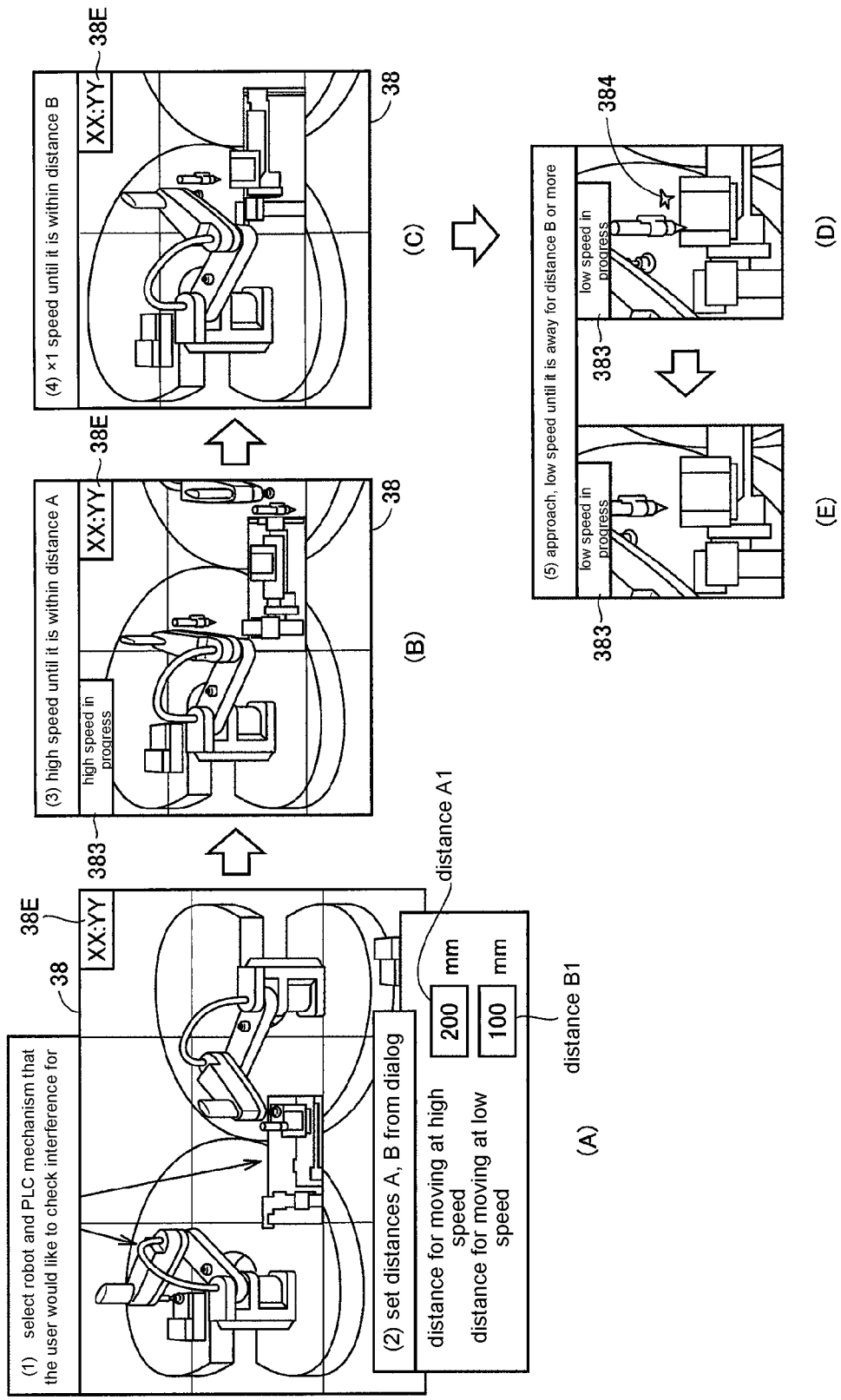
FIG. 21 includes diagrams (A) to (E) illustrating an example of the method of specifying a portion for performing high speed emulation and low speed emulation according to the present embodiment.

FIG. 21 includes diagrams (A) to (E) illustrating an example of the method of specifying a portion for performing high speed emulation and low speed emulation according to the present embodiment. The method of specifying the portion includes a specifying method performed based on whether the relative positional relationship between the robot 300 and the stage 400 in the three-dimensional virtual space satisfies a predetermined condition, for example. For example, it is possible to use a specifying method that is based on the distance between the robot 300 and the stage 400 in the three-dimensional virtual space calculated from the coordinates P(x, y, z) and the coordinates Q(x, y, 0).

On the screen of the display 38 of diagram (A) of FIG. 21, the user specifies the robot 300 and the stage 400 as targets for emulation, and specifies in the dialog box the values of the distance A1 and the distance B1 under the high speed emulation implementation condition (distance>distance A1) and the low speed emulation implementation condition (distance<distance B1).

While the emulation is performed, the cycle generation part 18 calculates the distance from the coordinates P(x, y, z) and the coordinates Q(x, y, 0), and when determining that the condition of (calculated distance>distance A1) is satisfied, the cycle generation part 18 outputs the ×N calculation command for high speed emulation as shown in diagram (B) of FIG. 21; when determining that the calculated distance satisfies the condition of (distance B1≤calculated distance≤distance A1), the cycle generation part 18 outputs the ×1 calculation command as shown in FIG. 21C; and when determining that the condition of (calculated distance<distance B1) is satisfied, the cycle generation part 18 outputs the ×1/N calculation command for low speed emulation as shown in diagram (D) of FIG. 21 or diagram (E) of FIG. 21.

Diagram (D) of FIG. 21 shows a case where "interference" is detected while low speed emulation is performed, for example. If low speed emulation is being performed, the user can grasp in detail the movement (for example, the movement in diagram (E) of FIG. 21) of the robot 300 or the stage 400 before and after the "interference" is detected with a slow drawing. When "interference" is detected as shown in diagram (D) of FIG. 21, the program execution part 31 may stop the execution of the PLC emulator 260 and the robot emulator 270. Alternatively, when "interference" is detected, the user may input an emulation stop command, which is given to the program execution part 31.

<L. Detailed Setting for Emulation>

Figure 22B:
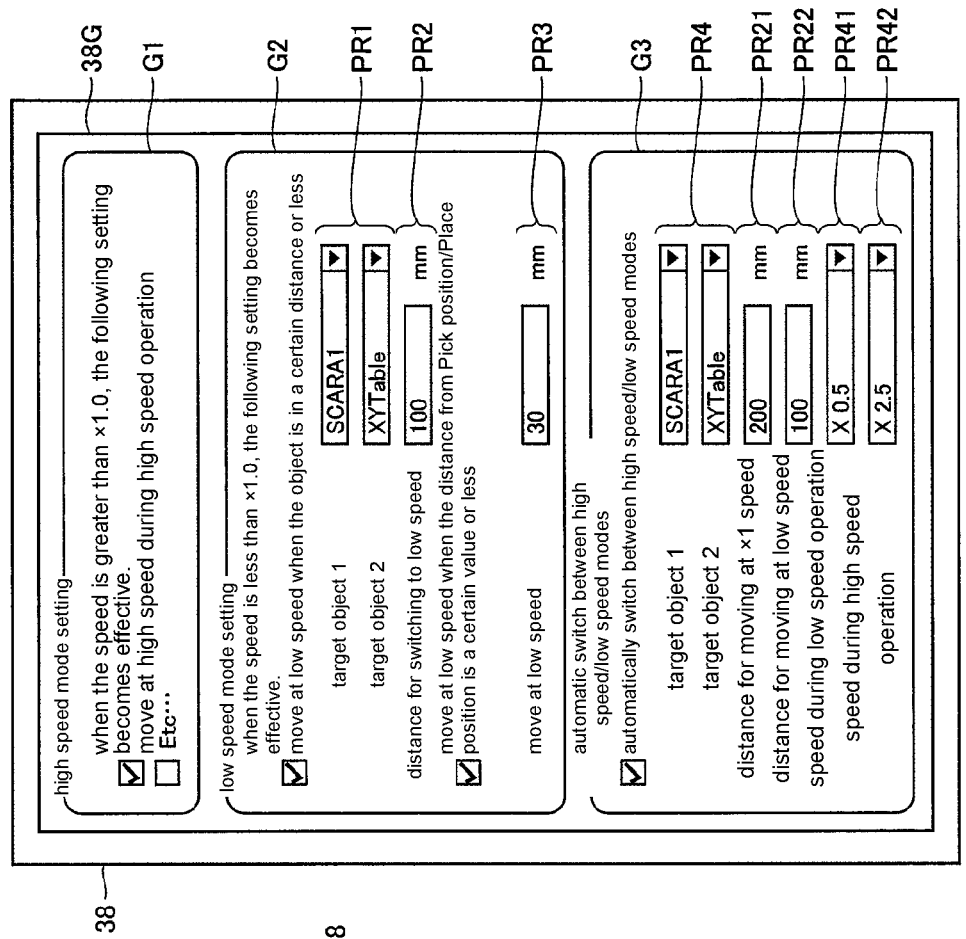
FIG. 22A and FIG. 22B are diagrams showing an example of the UI (user interface) screen for specifying an operation mode of emulation according to the present embodiment.
Figure 22A:
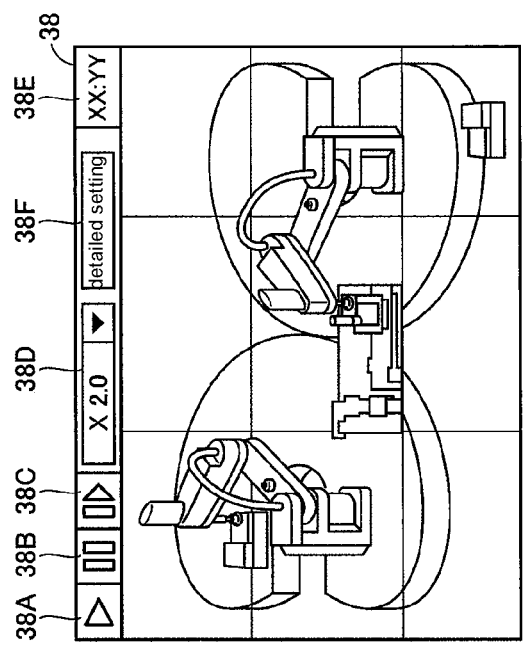

FIG. 22A and FIG. 22B are diagrams showing an example of a UI (user interface) screen for specifying an operation mode of emulation according to the present embodiment. The input receiving part 11 receives a user's operation made via the UI screen of the display 38 of FIG. 22, and outputs the received operation content to the control part 10. The control part 10 generates a mode command MC indicating the operation mode for emulation based on the operation content of the user and outputs it to the cycle generation part 18. The cycle generation part 18 outputs a calculation command according to the operation mode set by the mode command MC to the program execution part 31.

In the dialog box of FIG. 22A, an icon 38F is added besides the icons 38A to 38D described above. The icon 38F is operated for setting details of the operation mode.

When the user operates the icon 38F, a screen 38G of FIG. 22B is displayed on the display 38. The screen 38G is an example of the screen for receiving a user's operation made for detailed setting of the operation mode. The screen 38G includes, for example, a region G1 for setting the operation mode of high speed emulation, a region G2 for setting the operation mode of low speed emulation, and a region G3. In the region G3, for example, when emulation is performed by combining high speed emulation and low speed emulation, an operation mode can be set for switching between the emulations.

In the region G1, the operation mode that can be set includes setting of whether high speed emulation is to be performed in the constant speed section, for example, but the mode that can be set is not limited thereto.

In the region G2, the operation mode that can be set, for example, includes a setting PR1 of a group of objects (for example, robot 300 and stage 400) for which low speed emulation should be performed when the above-described condition of (calculated distance <distance B) is satisfied, and a setting PR2 of the distance B. It may also include a setting PR3 related to the "pick & place operation". The setting PR3 indicates the movement amount corresponding to the portion where low speed emulation should be performed in the actions before and after pick or place. For example, as the setting PR3, it is possible to set the preceding and following portions including pick or place on the trajectory 211 of the robot 300 as the moving distance on the trajectory.

In the region G3, the operation mode that can be set, for example, includes a setting PR4 of a group of objects (for example, robot 300 and stage 400) for which high speed emulation and low speed emulation are performed in combination, and a setting PR21 and a setting PR22 of the above-described distance A1 and distance B1. Also, the operation mode that can be set, for example, includes, a setting PR41 and a setting PR42 of the speed of low speed emulation and the speed of high speed emulation, that is, the value "N" of the ×N calculation command and the ×1/N calculation command.

As a result, various setting contents on the screen of FIG. 22A and FIG. 22B are included in the calculation command of the cycle generation part 18 and outputted to the program execution part 31. Therefore, when performing high speed emulation according to the ×N calculation command, the PLC emulator 260 and the robot emulator 270 carries out emulation according to the setting of the region G1, and when performing low speed emulation according to the ×1/N calculation command, the PLC emulator 260 and the robot emulator 270 carries out emulation according to the setting of the region G2. In addition, when combining high speed emulation and low speed emulation, the PLC emulator 260 and the robot emulator 270 carries out emulation according to the setting of the region G3.

<M. Computer Program>

FIG. 1 shows a configuration example that the CPU 2 of the information processing apparatus 100 is provided for executing a program. However, a part or all of the provided configuration may also be implemented by using a dedicated hardware circuit (for example, ASIC (application specific integrated circuit) or FPGA (field-programmable gate array), etc.). Alternatively, the main parts of the information processing apparatus 100 may be realized by using hardware that complies with a general-purpose architecture. In this case, a plurality of OSs (operating systems) for different uses may be executed in parallel by using a virtualization technique, and the required applications may be executed on the respective OSs.

Further, the information processing apparatus 100 may include a plurality of processors, such as the CPU 2. In this case, each part shown in FIG. 1 can be executed by a plurality of processors. In addition, when the CPU 2 includes a plurality of cores, each part shown in FIG. 1 can be executed by a plurality of cores in the CPU 2.

The offline system 20 includes the CPU 2, ROM 3, RAM 4, etc., and controls each component according to information processing. The storage part for storing the program of each component is an auxiliary storage device, such as the HDD 5, solid state drive, etc., and stores the PLC emulator 260 and the robot emulator 270, the virtual time generation program 29, the 3D visualization program 30, the simulation control program 21, etc. executed by the program execution part 31.

The storage medium 92 is a medium that accumulates information of the program, etc. by electric, magnetic, optical, mechanical, or chemical action for the computer, other devices or machines to read the recorded information of the program. The CPU 2 of the information processing apparatus 100 may acquire the above-mentioned program from the storage medium 92.

<N. Supplement>

The present embodiment as described above includes the following technical concepts.

[Configuration 1]

An information processing apparatus (100), includes:

a first emulator (260) estimating a behavior of a first driving device (14) for driving a first control target (400) that moves on a first target trajectory;

a second emulator (270) estimating a behavior of a second driving device (14) for driving a second control target (300) that moves on a second target trajectory; and a visualization module (30) generating drawing data (301, 401) for visualizing and drawing movement of the first control target and movement of the second control target in the same three-dimensional virtual space, wherein the first emulator calculates a first command value (V1) that controls the first driving device in each control cycle according to a calculation command (280) from the information processing apparatus, the second emulator calculates a second command value (V2) that controls the second driving device in each control cycle according to the calculation command, the visualization module generates the drawing data by using the first command value and the second command value, and the calculation command includes a movement amount variable command that instructs to calculate a command value for setting a movement amount of the movement in each control cycle variable.

[Configuration 2]

The information processing apparatus according to Configuration 1, wherein the calculation command includes a ×1 calculation command that instructs to calculate a command value for setting the movement amount in each control cycle equal to a predetermined unit movement amount.

[Configuration 3]

The information processing apparatus according to Configuration 2, wherein the movement amount variable command includes a ×N calculation command that instructs to calculate a command value for setting the movement amount in each control cycle to N times (where N>1) the unit movement amount.

[Configuration 4]

The information processing apparatus according to Configuration 2 or 3, wherein the movement amount variable command includes a ×1/N calculation command that instructs to calculate a command value for setting the movement amount in each control cycle to 1/N times (where N>1) the unit movement amount.

[Configuration 5]

The information processing apparatus according to Configuration 3, wherein the information processing apparatus detects a first change amount (DV1) of the first command value between control cycles and a second change amount (DV2) of the second command value between control cycles, and outputs the ×N calculation command in a section corresponding to a common elapsed time since a time of start of emulation in the first target trajectory and the second target trajectory and a section (410, 411) where both the first change amount and the second change amount are equal to or less than a threshold value.

[Configuration 6]

The information processing apparatus according to any one of Configurations 1 to 5, wherein the drawing data includes data (251, 252) that indicates positions of the first control target and the second control target in the three-dimensional virtual space, and the information processing apparatus outputs the movement amount variable command if a relative positional relationship between the first control target and the second control target in the three-dimensional virtual space satisfies a predetermined condition.

[Configuration 7]

The information processing apparatus according to any one of Configurations 1 to 6, wherein the information processing apparatus includes a receiving part (11) receiving input of a user for the information processing apparatus, and outputs the movement amount variable command according to the input received by the receiving part.

[Configuration 8]

The information processing apparatus according to any one of Configurations 1 to 7, wherein the information processing apparatus detects a first change amount (DV1) of the first command value between control cycles and a second change amount (DV2) of the second command value between control cycles, and outputs a warning (382) if the first change amount or the second change amount exceeds a change amount threshold value.

[Configuration 9]

The information processing apparatus according to any one of Configurations 1 to 8, wherein the drawing data includes data (251, 252) that indicates positions of the first control target and the second control target in the three-dimensional virtual space, and the information processing apparatus outputs a warning (382) if a change amount of a moving distance between control cycles based on the position of the first control target in the three-dimensional virtual space or a change amount of a moving distance between control cycles based on the position of the second control target in the three-dimensional virtual space exceeds a distance threshold value.

[Configuration 10]

The information processing apparatus according to any one of Configurations 1 to 9, further includes a timer (18) outputting a variable virtual time, wherein the control cycle indicates a cycle that uses the virtual time as a scale.

[Configuration 11]

A processing method performed by an information processing apparatus, includes:

estimating a behavior of a first driving device (14) for driving a first control target (400) that moves on a first target trajectory (40, 41, 42, 43);

estimating a behavior of a second driving device for driving a second control target that moves on a second target trajectory (40, 41, 42, 43); and generating drawing data for visualizing and drawing movement of the first control target and movement of the second control target in the same three-dimensional virtual space (50, 51, 52, 53), wherein when estimating the behavior of the first driving device, a first command value that controls the first driving device in each control cycle is calculated according to a calculation command from the information processing apparatus (S1, S13, S13a), when estimating the behavior of the second driving device, a second command value that controls the second driving device in each control cycle is calculated according to the calculation command (S1, S13, S13a), when generating the drawing data, the drawing data is generated by using the first command value and the second command value (S4), and the calculation command includes a movement amount variable command that instructs to calculate a command value for setting a movement amount of the movement in each control cycle variable.

[Configuration 12]

A program is for enabling a computer to execute the information processing method according to Configuration 11.

<O. Advantages>

As described above, according to the present embodiment, it is possible to calculate the command values V1 and V2 with any of the ×1 calculation command, the ×N calculation command, and the ×1/N calculation command as the calculation command in the emulation. The command values V1 and V2, by which the movement amount is obtained by performing calculation N times with use of the ×1 calculation command, can be obtained by performing calculation one time with the ×N calculation command. In other words, (N−1) times of calculation can be omitted. Therefore, by reducing the number of times of calculation, the processing load applied on the information processing apparatus 100 for performing emulation can be reduced. Additionally, the movement of the robot 300 and the movement of the stage 400 can be drawn on the display 38 at a high speed, so that it is possible to achieve the so-called movement fast forwarding.

In the case of the ×1/N calculation command, for example, a combination of the ×1 calculation command and the sleep command may be included. Since the calculation can be performed in only one of the N control cycles and can be stopped by the sleep command in the other control cycles, the processing load on the information processing apparatus 100 related to the calculation of the command values V1 and V2 can be reduced. In comparison with the ×1 calculation command, the movements of the robot 300 and the stage 400 can be drawn at a speed that is 1/N times slower in the drawing cycle, and as in the so-called slow playback, the user can confirm detailed movement of the robot 300 or the stage 400.

The present embodiment disclosed herein is exemplary and should not be construed restrictive in all aspects. The scope of the disclosure is defined by the claims instead of the above descriptions, and it is intended to include the equivalent of the scope of the claims and all modifications within the scope.

What is claimed is:

1. An information processing apparatus, comprising:
   a first emulator estimating a behavior of a PLC for driving a first control target that moves on a first target trajectory;
   a second emulator estimating a behavior of a robot for driving a second control target that moves on a second target trajectory; and
   a hardware processor generates drawing data for visualizing and drawing movement of the first control target and movement of the second control target in a same three-dimensional virtual space,
   wherein the first emulator calculates a first command value that controls the PLC in each control cycle according to a calculation command in the same three-dimensional virtual space from the information processing apparatus,
   the second emulator calculates a second command value that controls the robot in each control cycle according to the calculation command in the same three-dimensional virtual space,
   the hardware processor generates the drawing data by using the first command value and the second command value, and
   the calculation command comprises a movement amount variable command that instructs to calculate a command value for setting a movement amount of movement in each control cycle variable,
   wherein the calculation command comprises a ×1 calculation command that instructs to calculate a command value for setting the movement amount in each control cycle equal to a unit movement amount that is predetermined,
   wherein the movement amount variable command comprises a ×N calculation command that instructs to calculate a command value for setting the movement amount in each control cycle to N times (where N>1) the unit movement amount,
   wherein the information processing apparatus detects a first change amount of the first command value between control cycles and a second change amount of the second command value between control cycles, and outputs the ×N calculation command in a section corresponding to a common elapsed time since a time of start of emulation in the first target trajectory and the second target trajectory and a section where both the first change amount and the second change amount are equal to or less than a threshold value.

2. The information processing apparatus according to claim 1, wherein the movement amount variable command comprises a ×1/N calculation command that instructs to calculate a command value for setting the movement amount in each control cycle to 1/N times (where N>1) the unit movement amount.

3. The information processing apparatus according to claim 1, wherein the movement amount variable command comprises a ×1/N calculation command that instructs to calculate a command value for setting the movement amount in each control cycle to 1/N times (where N>1) the unit movement amount.

4. The information processing apparatus according to claim 1, wherein the drawing data comprises data that indicates positions of the first control target and the second control target in the three-dimensional virtual space, and
   the information processing apparatus outputs the movement amount variable command if a positional relationship between the first control target and the second control target in the three-dimensional virtual space satisfies a predetermined condition.

5. The information processing apparatus according to claim 2, wherein the drawing data comprises data that indicates positions of the first control target and the second control target in the three-dimensional virtual space, and
   the information processing apparatus outputs the movement amount variable command if a positional relationship between the first control target and the second control target in the three-dimensional virtual space satisfies a predetermined condition.

6. The information processing apparatus according to claim 3, wherein the drawing data comprises data that indicates positions of the first control target and the second control target in the three-dimensional virtual space, and
   the information processing apparatus outputs the movement amount variable command if a positional relationship between the first control target and the second control target in the three-dimensional virtual space satisfies a predetermined condition.

7. The information processing apparatus according to claim 1, wherein the information processing apparatus comprises a receiver receiving input of a user for the information processing apparatus, and outputs the movement amount variable command according to the input received by the receiver.

8. The information processing apparatus according to claim 1, wherein the information processing apparatus detects a first change amount of the first command value between control cycles and a second change amount of the second command value between control cycles, and outputs a warning if the first change amount or the second change amount exceeds a change amount threshold value.

9. The information processing apparatus according to claim 1, wherein the drawing data comprises data that indicates positions of the first control target and the second control target in the three-dimensional virtual space, and
   the information processing apparatus outputs a warning if a change amount of a moving distance between control cycles based on a position of the first control target in the three-dimensional virtual space or a change amount of a moving distance between control cycles based on a position of the second control target in the three-dimensional virtual space exceeds a distance threshold value.

10. The information processing apparatus according to claim 1, further comprising a timer outputting a variable virtual time,
   wherein the control cycle indicates a cycle that uses the virtual time as a scale.

* * * * *